United States Patent
Xia et al.

(10) Patent No.: US 9,068,026 B2
(45) Date of Patent: Jun. 30, 2015

(54) MAGNESIUM HALIDE ADDUCTS, CATALYST COMPONENTS AND CATALYSTS COMPRISING THE SAME, AND PREPARATION PROCESSES THEREOF

(75) Inventors: Xianzhi Xia, Beijing (CN); Yuexiang Liu, Beijing (CN); Jin Zhao, Beijing (CN); Jigui Zhang, Beijing (CN); Yongtai Ling, Beijing (CN); Weili Li, Beijing (CN); Suzhen Qiao, Beijing (CN); Yang Tan, Beijing (CN); Renqi Peng, Beijing (CN); Ping Gao, Beijing (CN); Futang Gao, Beijing (CN); Zhihui Zhang, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 257 days.

(21) Appl. No.: 13/480,866

(22) Filed: May 25, 2012

(65) Prior Publication Data

US 2012/0302708 A1 Nov. 29, 2012

(30) Foreign Application Priority Data

May 27, 2011 (CN) .......................... 2011 1 0142024
May 27, 2011 (CN) .......................... 2011 1 0142025
May 27, 2011 (CN) .......................... 2011 1 0142156
May 27, 2011 (CN) .......................... 2011 1 0142182

(51) Int. Cl.

| | | |
|---|---|---|
| *B01J 31/00* | (2006.01) | |
| *B01J 37/00* | (2006.01) | |
| *C08F 4/02* | (2006.01) | |
| *C08F 2/00* | (2006.01) | |
| *C08F 10/00* | (2006.01) | |
| *C08F 110/06* | (2006.01) | |

(52) U.S. Cl.
CPC ............... *C08F 10/00* (2013.01); *C08F 110/06* (2013.01)

(58) Field of Classification Search
CPC ............. B01J 31/00; B01J 37/00; C08F 4/02; C08F 4/60; C08F 2/00
USPC .................. 502/111, 127, 125; 526/212, 213
See application file for complete search history.

(56) References Cited

U.S. PATENT DOCUMENTS

| | | | |
|---|---|---|---|
| 4,399,054 A | 8/1983 | Ferraris et al. | |
| 4,421,674 A | 12/1983 | Invernizzi et al. | |
| 4,469,648 A | 9/1984 | Ferraris et al. | |
| 5,100,849 A | 3/1992 | Miya et al. | |
| 5,459,116 A * | 10/1995 | Ro et al. ........................ | 502/115 |
| 6,020,279 A | 2/2000 | Uwai et al. | |
| 6,127,304 A | 10/2000 | Sacchetti et al. | |
| 6,323,152 B1 | 11/2001 | Sacchetti et al. | |
| 6,437,061 B1 | 8/2002 | Sacchetti et al. | |
| 6,914,028 B2 | 7/2005 | Yang et al. | |
| 7,164,248 B2 | 1/2007 | Hayashi | |
| 7,361,621 B2 | 4/2008 | Yang et al. | |
| 7,388,061 B2 | 6/2008 | Gao et al. | |

FOREIGN PATENT DOCUMENTS

| | | |
|---|---|---|
| CN | 1226901 A | 8/1999 |
| CN | 1397568 A | 2/2003 |
| CN | 1436796 A | 8/2003 |
| CN | 1463990 A | 12/2003 |
| CN | 1169840 C | 10/2004 |
| CN | 1169845 C | 10/2004 |
| CN | 1563112 A | 1/2005 |
| CN | 1267508 C | 8/2006 |
| CN | 1330086 C | 8/2007 |
| CN | 101050245 A | 10/2007 |
| CN | 102040680 A | 5/2011 |
| EP | 0395383 A2 | 10/1990 |
| WO | WO 87/07620 | 12/1987 |
| WO | WO 93/11166 | 6/1993 |

* cited by examiner

*Primary Examiner* — David W Wu
*Assistant Examiner* — Elizabeth Eng
(74) *Attorney, Agent, or Firm* — Finnegan, Henderson, Farabow, Garrett & Dunner, LLP

(57) ABSTRACT

A magnesium halide adduct is provided, comprising at least one compound of the formula MgXY, at least one compound of the formula ROH, methanol, at least one modifying agent chosen from DOE and o-hydroxy benzoates, and optionally water. Also provided herein are a catalyst component comprising the magnesium halide adduct, a catalyst for olefin polymerization comprising the catalyst component; the respective processes for preparing the magnesium halide adduct and the catalyst component; use of the magnesium halide adduct for preparing the catalyst component, use of the catalyst component in a catalyst for olefin polymerization and use of the catalyst in olefin polymerization; and a process of olefin polymerization.

27 Claims, 3 Drawing Sheets

MAGNESIUM HALIDE ADDUCTS, CATALYST COMPONENTS AND CATALYSTS COMPRISING THE SAME, AND PREPARATION PROCESSES THEREOF

The present application claims priority to four Chinese Patent Application Nos. CN201110142156.X, CN201110142182.2, CN201110142024.7 and CN 201110142025.1, all filed on May 27, 2011, which are incorporated herein by reference in their entirety.

The present disclosure relates to a magnesium halide adduct, a catalyst component comprising the magnesium halide adduct, and a catalyst comprising the catalyst component for olefin polymerization; to the respective preparation processes of the magnesium halide adduct and the catalyst component; to use of the magnesium halide adduct for preparing a catalyst component, use of the catalyst component in a catalyst for olefin polymerization, and use of the catalyst in olefin polymerization; and to a process of olefin polymerization.

Ziegler-Natta catalysts can be prepared by supporting titanium compounds and electron donor compounds on active magnesium halides. In general, the active magnesium halides are magnesium halide-alcohol adducts, which, as supports, react with titanium halides and electron donor compounds to obtain spherical catalysts. When used in olefin polymerization, for example, propylene polymerization, such spherical catalysts can lead to relatively high polymerization activities and stereospecificity, and the resultant polymers can have good particle morphology.

The known magnesium halide-alcohol adducts may comprise binary components consisting of magnesium chloride and alcohol. In some cases, the magnesium halide-alcohol adducts further comprise a small amount of water. Such magnesium halide-alcohol adducts may be prepared by known processes, such as spray drying process, spray cooling process, high-pressure extruding process, or high-speed stirring process. The magnesium chloride-alcohol adducts are described in, for example, U.S. Pat. Nos. 4,421,674, 4,469,648, WO 87/07620, WO 93/11166, U.S. Pat. Nos. 5,100,849, 6,020,279, 4,399,054, EP 0 395 383, U.S. Pat. Nos. 6,127,304, 6,323,152 and CN 1,226,901A. Among them, for example, CN 1,226,901A discloses an adduct $MgCl_2 \cdot mROH \cdot nH_2O$, wherein R is $C_1$-$C_{10}$ alkyl group, $2 \leq m \leq 4.2$ and $0 \leq n \leq 0.7$. However, when the catalysts prepared from such magnesium halide-alcohol adducts are used in olefin polymerization, a cracking phenomenon of the polymer particles may take place so easily that there are many fine powders of the polymer. The main reason might be that catalytic active sites formed on the adduct supports during the reaction of the adducts with titanium halides and electron donor compounds are not uniformly distributed.

In order to overcome this drawback, it has been attempted to introduce in advance the electron donor compounds in the course of the preparation of the magnesium chloride-alcohol adduct supports. For example, as disclosed in Chinese Patent CN1397568A and CN1563112A, internal electron donors, such as phthalates, are introduced in preparation of the supports so as to form spherical "magnesium chloride-alcohol-phthalate" multi-component supports, which then react with titanium tetrachloride to form catalysts. The disclosed spherical supports have the average particle sizes, D50, ranging from 70 to 200 microns. When used in propylene polymerization, the catalysts provide a relatively low polymerization activity of 406 g PP/gcat.

In addition, another patent CN101050245A discloses a magnesium halide adduct represented by the formula: $MgX_2$-$mROH$-$nE$-$pH_2O$, wherein E is a dihydrocarbyloxy hydrocarbon, R is $C_1$-$C_{12}$ alkyl, $C_3$-$C_{10}$ cycloalkyl or $C_6$-$C_{10}$ aryl, m is in a range of from 1 to 5, n is in a range of from 0.005 to 1.0, and p is in a range of from 0 to 0.8. The magnesium halide adduct is prepared by a process comprising the steps of: (1) in a closed reactor, mixing the magnesium halide, the alcohol, the dihydrocarbyloxy hydrocarbon compound and optionally an inert medium, and heating the resultant mixture to a temperature ranging from 100 to 140° C. under stirring, to form a melt of a magnesium halide adduct, wherein the magnesium halide is added in an amount ranging from 0.1 to 1.0 mol/liter of the liquid medium, and the alcohol and the dihydrocarbyloxy hydrocarbon compound are added in an amount ranging from 1 to 5 moles and from 0.005 to 1 mole, respectively, with respect to one mole of magnesium; (2) applying shearing action on the above melt of the magnesium halide adduct and then discharging it into a cooling medium, to form spherical particles of the magnesium halide adduct, wherein the cooling medium is controlled at a temperature ranging from −40° C. to 0° C. However, the magnesium halide adduct prepared according to this process includes a large quantity of non-spherical particles, for example, needle-shaped particles and rod-shaped particles. When the catalyst comprising this magnesium halide adduct as a support is used in olefin polymerization, the resultant polymer may also include a large quantity of non-spherical particles.

Disclosed herein is, for example, a spherical magnesium halide adduct having a relatively regular spatial structure, which can overcome the above drawbacks of the existing magnesium halide adducts. The magnesium halide adduct disclosed herein comprises at least one compound of formula MgXY, at least one compound of formula ROH, methanol, at least one modifying agent chosen from DOE as defined below and o-hydroxy benzoates, and optionally water, wherein the formulae MgXY and ROH and the modifying agent are defined as below.

Also disclosed herein is a catalyst component for olefin polymerization prepared by using the magnesium halide adduct disclosed herein. The catalyst component comprises a reaction product of, for example, the spherical magnesium halide adduct disclosed herein, at least one titanium compound and at least one internal electron donor compound.

Further disclosed herein is a catalyst comprising the catalyst component for olefin polymerization disclosed herein. The catalyst comprises: (1) the catalyst component disclosed herein for olefin polymerization; (2) at least one alkyl aluminum compound; and (3) optionally at least one external electron donor compound.

Further disclosed herein is a process for preparing the magnesium halide adduct.

Further disclosed herein is a process for preparing the catalyst component.

Even further disclosed herein are use of the catalyst component in a catalyst for olefin polymerization and use of the catalyst in olefin polymerization.

Even further disclosed herein is a process of olefin polymerization, comprising contacting at least one olefin with the catalyst disclosed herein under olefin polymerization conditions, wherein the catalyst comprises: (1) the catalyst component disclosed herein for olefin polymerization; (2) at least one alkyl aluminum compound; and (3) optionally at least one external electron donor compound.

Figure 1:
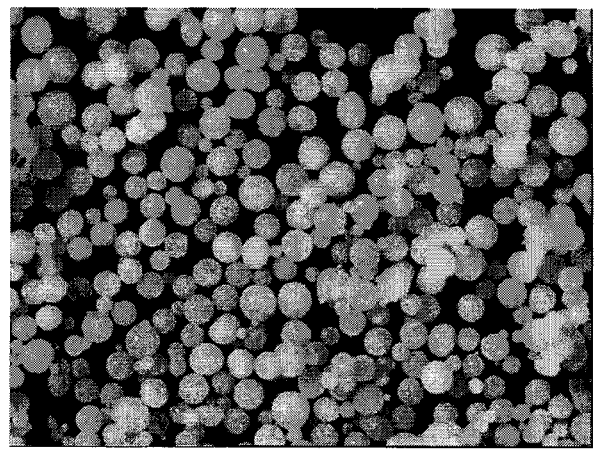
FIG. 1 shows an optical microscopic photograph of the spherical magnesium halide adduct prepared in Example 1.

In one embodiment, disclosed herein is a spherical magnesium halide adduct having a relatively regular spatial structure, which can overcome the above drawbacks of the existing magnesium halide adducts. The magnesium halide adduct disclosed herein comprises at least one compound of formula MgXY, at least one compound of formula ROH, methanol, at least one modifying agent chosen from DOE and o-hydroxy benzoates, and optionally water. The magnesium halide adduct disclosed herein can be with good particle morphology, smooth surface, good fluidity, and few or no non-spherical particles. Moreover, the catalyst prepared by using the magnesium halide adduct as a catalyst support can be used for olefin polymerization with a relatively good hydrogen sensitivity.

1. The Compound of Formula MgXY

One component in the magnesium halide adduct disclosed herein is the compound of formula MgXY, which is adducted with an alcohol. In the compound of formula MgXY disclosed herein, X is halogen, and Y, being independent of X, is chosen from halogen, $C_1$-$C_{14}$ alkyl, $C_1$-$C_{14}$ alkoxy, $C_6$-$C_{14}$ aryl, and $C_6$-$C_{14}$ aryloxy.

In one embodiment, X and Y both are halogen; or X is halogen, and Y may be chosen from $C_1$-$C_6$ alkyl, $C_1$-$C_6$ alkoxy, $C_6$-$C_{12}$ aryl, and $C_6$-$C_{12}$ aryloxy. The halogen is, for example, chlorine or bromine. The $C_1$-$C_6$ alkyl may be chosen, for example, from methyl, ethyl, propyl, isopropyl, butyl, and isobutyl. The $C_1$-$C_6$ alkoxy may be chosen, for example, from methoxy, ethoxy, propoxy, isopropoxy, butoxy, and isobutoxy. The $C_6$-$C_{12}$ aryl may be chosen, for example, from phenyl, o-tolyl, m-tolyl, p-tolyl, o-ethylphenyl, m-ethylphenyl, p-ethylphenyl, and naphthyl. The $C_6$-$C_{12}$ aryloxy may be chosen, for example, from phenoxy and naphthoxy.

In one further embodiment, the at least one compound of formula MgXY may be chosen from magnesium dichloride, magnesium dibromide, phenoxy magnesium chloride, isopropoxy magnesium chloride and butoxy magnesium chloride.

2. The Compound of Formula ROH

In the compound of formula ROH disclosed herein, R is chosen from $C_2$-$C_{12}$ alkyl, $C_3$-$C_{10}$ cycloalkyl, and $C_6$-$C_{10}$ aryl.

As disclosed herein, the compound of formula ROH refers to alcohols other than methanol. In one embodiment, in the formula ROH, R is chosen from $C_2$-$C_8$ alkyl, $C_3$-$C_8$ cycloalkyl, and $C_6$-$C_{10}$ aryl. The $C_2$-$C_8$ alkyl may be chosen, for example, from ethyl, propyl, isopropyl, butyl, isobutyl, pentyl, isopentyl, hexyl, isohexyl, heptyl, isoheptyl, octyl, and isooctyl. The $C_3$-$C_8$ cycloalkyl may be chosen, for example, from cyclopropyl, cyclobutyl, cyclopentyl, and cyclohexyl. The $C_6$-$C_{10}$ aryl may be chosen, for example, from phenyl, o-tolyl, m-tolyl, p-tolyl, o-ethylphenyl, m-ethylphenyl, p-ethylphenyl, and naphthyl.

In one further embodiment, the at least one compound of formula ROH may be chosen from ethanol, propanol, isopropanol, n-butanol, isobutanol, pentanol, isopentanol, n-hexanol, n-octanol, and 2-ethylhexanol.

3. The Modifying Agent

The magnesium halide adduct disclosed herein comprises, for example, at least one compound chosen from DOE and o-hydroxy benzoates as a modifying agent. In some embodiments, the DOE is chosen from polyol esters of formula (I)

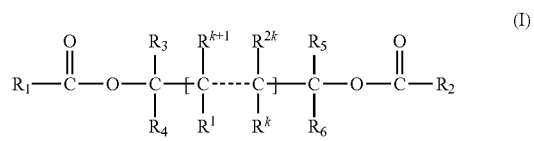

(I)

wherein, $R_1$ and $R_2$, which may be identical or different, may be independent of each other chosen from halogen, substituted and unsubstituted linear and branched $C_1$-$C_{20}$ alkyl, $C_3$-$C_{20}$ cycloalkyl, $C_6$-$C_{20}$ aryl, $C_7$-$C_{20}$ aralkyl, and $C_2$-$C_{20}$ alkenyl;

$R_3$-$R_6$ and $R^1$-$R^{2k}$, which may be identical or different, may be independent of each other chosen from hydrogen, halogen, substituted and unsubstituted, linear and branched $C_1$-$C_{20}$ alkyl, $C_3$-$C_{20}$ cycloalkyl, $C_6$-$C_{20}$ aryl, $C_7$-$C_{20}$ aralkyl, $C_2$-$C_{20}$ alkenyl, $C_2$-$C_{20}$ ester groups, heteroatom-containing $C_1$-$C_{20}$ alkyl, heteroatom-containing $C_3$-$C_{20}$ cycloalkyl, heteroatom-containing $C_6$-$C_{20}$ aryl, heteroatom-containing $C_7$-$C_{20}$ aralkyl, and heteroatom-containing $C_2$-$C_{20}$ alkenyl, wherein the heteroatom may be one or more chosen from halogen, nitrogen, oxygen, sulfur, silicon, and phosphorus;

Alternatively, two or more of $R_3$-$R_6$ and $R^1$-$R^{2k}$ are linked to form at least one ring structure chosen from saturated and unsaturated ring structures;

The moiety in the parentheses "[ ]" represents k carbon atoms linked in sequence, and each of the carbon atoms is further linked to two substituents, that is, there are k carbon atoms and 2k substituents $R^1$, $R^2$, $R^3$ ... $R^{2k}$ in the parentheses;

k is an integer ranging from 0 to 10; when k=0, in the polyol ester of the formula (I), the carbon atom substituted with $R_3$ and $R_4$ is directly linked to the carbon atom substituted with $R_5$ and $R_6$.

In one embodiment, $R_1$ and $R_2$, which are identical or different, are independent of each other, chosen from halogen, $C_1$-$C_{12}$ alkyl, $C_3$-$C_{12}$ cycloalkyl, $C_6$-$C_{12}$ aryl, $C_7$-$C_{12}$ aralkyl, and $C_2$-$C_{12}$ alkenyl. In another embodiment, $R_1$ and $R_2$, which are identical or different, are independent of each other, chosen from $C_1$-$C_6$ alkyl, $C_3$-$C_6$ cycloalkyl, $C_6$-$C_8$ aryl, and $C_7$-$C_8$ aralkyl; for example, independently chosen from methyl, ethyl, n-propyl, isopropyl, n-butyl, t-butyl, n-pentyl, isopentyl, neopentyl, n-hexyl, cyclopropyl, cyclobutyl, cyclopentyl, cyclohexyl, phenyl, tolyl, dimethylphenyl, ethylphenyl, benzyl, methylbenzyl and phenylethyl.

In one embodiment, $R_3$-$R_6$ and $R^1$-$R^{2k}$, which are identical or different, are independent of each other, chosen from hydrogen, halogen, $C_1$-$C_{12}$ alkyl, $C_3$-$C_{12}$ cycloalkyl, $C_6$-$C_{12}$ aryl, $C_7$-$C_{12}$ aralkyl, $C_2$-$C_{12}$ alkenyl, and $C_2$-$C_{12}$ ester groups. In another embodiment, $R_3$-$R_6$, which are identical or different, are independent of each other, chosen from hydrogen, $C_1$-$C_6$ alkyl, and $C_3$-$C_6$ cycloalkyl; for example, independently chosen from hydrogen, methyl, ethyl, n-propyl, isopropyl, n-butyl, t-butyl, n-pentyl, isopentyl, neopentyl, n-hexyl, cyclopropyl, cyclobutyl, cyclopentyl, and cyclohexyl; $R^1$-$R^{2k}$, which are identical or different, are independent of each other, are chosen from hydrogen and $C_1$-$C_4$ alkyl; for example, independently chosen from hydrogen, methyl, ethyl, n-propyl, isopropyl, n-butyl and t-butyl.

In one embodiment, the DOE is chosen from diol esters of formula (Ia):

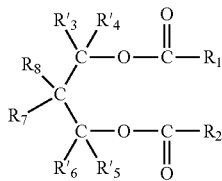

(Ia)

wherein, $R_1$ and $R_2$ are the same as defined in formula (I); $R_3'$-$R_6'$, $R_7$ and $R_8$, which may be identical or different, may be independent of each other, chosen from hydrogen, halogen, substituted and unsubstituted linear and branched $C_1$-$C_{20}$ alkyl, $C_3$-$C_{20}$ cycloalkyl, $C_6$-$C_{20}$ aryl, $C_7$-$C_{20}$ aralkyl, $C_2$-$C_{20}$ alkenyl, heteroatom-containing $C_1$-$C_{20}$ alkyl, heteroatom-containing $C_3$-$C_{20}$ cycloalkyl, heteroatom-containing $C_6$-$C_{20}$ aryl, heteroatom-containing $C_7$-$C_{20}$ aralkyl, and heteroatom-containing $C_2$-$C_{20}$ alkenyl;

alternatively, two or more of $R_3'$-$R_6'$ and $R_7$-$R_8$ are linked to form at least one ring structure chosen from saturated and unsaturated ring structure; and wherein the heteroatom may be one or more chosen from halogen, nitrogen, oxygen, sulfur, silicon and phosphorus.

In one further embodiment, in formula (Ia), $R_1$ and $R_2$, which are identical or different, are independent of each other, chosen from halogen, $C_1$-$C_{12}$ alkyl, $C_3$-$C_{12}$ cycloalkyl, $C_6$-$C_{12}$ aryl, $C_7$-$C_{12}$ aralkyl and $C_2$-$C_{12}$ alkenyl; $R_3'$-$R_6'$ and $R_7$-$R_8$, which are identical or different, are independent of each other, chosen from hydrogen, halogen, $C_1$-$C_{12}$ alkyl, $C_3$-$C_{12}$ cycloalkyl, $C_6$-$C_{12}$ aryl, $C_7$-$C_{12}$ aralkyl and $C_2$-$C_{12}$ alkenyl.

In another embodiment, in formula (Ia), $R_1$ and $R_2$, which are identical or different, are independent of each other, chosen from $C_1$-$C_6$ alkyl, $C_3$-$C_6$ cycloalkyl, $C_6$-$C_8$ aryl and $C_7$-$C_8$ aralkyl; for example, independently chosen from methyl, ethyl, n-propyl, isopropyl, n-butyl, t-butyl, n-pentyl, isopentyl, neopentyl, n-hexyl, cyclopropyl, cyclobutyl, cyclopentyl, cyclohexyl, phenyl, tolyl, dimethylphenyl, ethylphenyl, benzyl, methylbenzyl and phenylethyl;

Likewise, in yet another embodiment, in formula (Ia), $R_3'$-$R_6'$, which are identical or different, are independent of each other, chosen from hydrogen, $C_1$-$C_6$ alkyl and $C_3$-$C_6$ cycloalkyl; for example, independently chosen from hydrogen, methyl, ethyl, n-propyl, isopropyl, n-butyl, t-butyl, n-pentyl, isopentyl, neopentyl, n-hexyl, cyclopropyl, cyclobutyl, cyclopentyl, and cyclohexyl; $R_7$-$R_8$, which are identical or different, are independent of each other, chosen from hydrogen and $C_1$-$C_4$ alkyl; for example, independently chosen from hydrogen, methyl, ethyl, n-propyl, isopropyl, n-butyl and t-butyl.

As disclosed herein, suitable DOE can be selected by a person skilled in the art according to the above description, but the above diol ester of formula (Ia) is, for example, used in some embodiments. Some examples of DOE are chosen from 1,3-propanediol dibenzoate, 2-methyl-1,3-propanediol dibenzoate, 2-ethyl-1,3-propanediol dibenzoate, 2,2-dimethyl-1,3-propanediol dibenzoate, (R)-1-phenyl-1,3-propanediol dibenzoate, 1,3-diphenyl-1,3-propanediol dibenzoate, 1,3-diphenyl-1,3-propanediol di-n-propionate, 1,3-diphenyl-2-methyl-1,3-propanediol dipropionate, 1,3-diphenyl-2-methyl-1,3-propanediol diacetate, 1,3-diphenyl-2,2-dimethyl-1,3-propanediol dibenzoate, 1,3-diphenyl-2,2-dimethyl-1,3-propanediol dipropionate, 1,3-di-t-butyl-2-ethyl-1,3-propanediol dibenzoate, 1,3-diphenyl-1,3-propanediol diacetate, 1,3-diisopropyl-1,3-propanediol di(4-butylbenzoate), 1-phenyl-2-amino-1,3-propanediol dibenzoate, 1-phenyl-2-methyl-1,3-butanediol dibenzoate, 2,4-pentanediol dibenzoate, 3-butyl-2,4-pentanediol dibenzoate, 3,3-dimethyl-2,4-pentanediol dibenzoate, 2,4-pentanediol di(p-chlorobenzoate), 2,4-pentanediol di(m-chloro benzoate), 2,4-pentanediol di(p-bromobenzoate), 2,4-pentanediol di(o-bromobenzoate), 2,4-pentanediol di(p-methylbenzoate), 2,4-pentanediol di(p-t-butylbenzoate), 2,4-pentanediol di(p-butylbenzoate), 2-methyl-1,3-pentanediol di(p-chlorobenzoate), 2-methyl-1,3-pentanediol di(p-methylbenzoate), 2-butyl-1,3-pentanediol di(p-methylbenzoate), 2-methyl-1,3-pentanediol di(p-t-butylbenzoate), 2-methyl-1,3-pentanediol neopentanoate, 2-methyl-1,3-pentanediol benzoate cinnamate, 2,2-dimethyl-1,3-pentanediol dibenzoate, 2,2-dimethyl-1,3-pentanediol benzoate cinnamate, 2-ethyl-1,3-pentanediol dibenzoate, 2-butyl-1,3-pentanediol dibenzoate, 2-allyl-1,3-pentanediol dibenzoate, 2-methyl-1,3-pentanediol dibenzoate, 2-ethyl-1,3-pentanediol dibenzoate, 2-propyl-1,3-pentanediol dibenzoate, 2-butyl-1,3-pentanediol dibenzoate, 1,3-pentanediol di(p-chlorobenzoate), 1,3-pentanediol di(m-chloro benzoate), 1,3-pentanediol di(p-bromobenzoate), 1,3-pentanediol di(o-bromobenzoate), 1,3-pentanediol di(p-methylbenzoate), 1,3-pentanediol di(p-t-butylbenzoate), 1,3-pentanediol di(p-butylbenzoate), 1,3-pentanediol benzoate cinnamate, 1,3-pentanediol dicinnamate, 1,3-pentanediol dipropionate, 2,2,4-trimethyl-1,3-pentanediol diisopropylformate, 1-trifluoromethyl-3-methyl-2,4-pentanediol dibenzoate, 2,4-pentanediol di-p-fluoromethyl benzoate, 2,4-pentanediol di(2-furanformate), 2-methyl-6-heptene-2,4-heptanediol dibenzoate, 3-methyl-6-heptene-2,4-heptanediol dibenzoate, 4-methyl-6-heptene-2,4-heptanediol dibenzoate, 5-methyl-6-heptene-2,4-heptanediol dibenzoate, 6-methyl-6-heptene-2,4-heptanediol dibenzoate, 3-ethyl-6-heptene-2,4-heptanediol dibenzoate, 4-ethyl-6-heptene-2,4-heptanediol dibenzoate, 5-ethyl-6-heptene-2,4-heptanediol dibenzoate, 6-ethyl-6-heptene-2,4-heptanediol dibenzoate, 3-propyl-6-heptene-2,4-heptanediol dibenzoate, 4-propyl-6-heptene-2,4-heptanediol dibenzoate, 5-propyl-6-heptene-2,4-heptanediol dibenzoate, 6-propyl-6-heptene-2,4-heptanediol dibenzoate, 3-butyl-6-heptene-2,4-heptanediol dibenzoate, 4-butyl-6-heptene-2,4-heptanediol dibenzoate, 5-butyl-6-heptene-2,4-heptanediol dibenzoate, 6-butyl-6-heptene-2,4-heptanediol dibenzoate, 3,5-dimethyl-6-heptene-2,4-heptanediol dibenzoate, 3,5-diethyl-6-heptene-2,4-heptanediol dibenzoate, 3,5-dipropyl-6-heptene-2,4-heptanediol dibenzoate, 3,5-dibutyl-6-heptene-2,4-heptanediol dibenzoate, 3,3-dimethyl-6-heptene-2,4-heptanediol dibenzoate, 3,3-diethyl-6-heptene-2,4-heptanediol dibenzoate, 3,3-dipropyl-6-heptene-2,4-heptanediol dibenzoate, 3,3-dibutyl-6-heptene-2,4-heptanediol dibenzoate, 3-ethyl-3,5-heptanediol dibenzoate, 4-ethyl-3,5-heptanediol dibenzoate, 3-propyl-3,5-heptanediol dibenzoate, 4-propyl-3,5-heptanediol dibenzoate, 3-butyl-3,5-heptanediol dibenzoate, 2,3-dimethyl-3,5-heptanediol dibenzoate, 2,4-dimethyl-3,5-heptanediol dibenzoate, 2,5-dimethyl-3,5-heptanediol dibenzoate, 4,4-dimethyl-3,5-heptanediol dibenzoate, 4,5-dimethyl-3,5-heptanediol dibenzoate, 4,6-dimethyl-3,5-heptanediol dibenzoate, 6,6-dimethyl-3,5-heptanediol dibenzoate, 2-methyl-3-ethyl-3,5-heptanediol dibenzoate, 2-methyl-4-ethyl-3,5-heptanediol dibenzoate, 2-methyl-5-ethyl-3,5-heptanediol dibenzoate, 3-methyl-4-ethyl-3,5-heptanediol dibenzoate, 3-methyl-5-ethyl-3,5-heptanediol dibenzoate, 4-methyl-3-ethyl-3,5-heptanediol dibenzoate, 4-methyl-4-ethyl-3,5-heptanediol dibenzoate, 9,9-bis(benzoyloxymethyl)fluorene, 9,9-bis((m-methoxybenzoyloxy)methyl)fluorene, 9,9-bis((m-chlorobenzoyloxy)methyl)fluorene, 9,9-bis((p-chlorobenzoyloxy)methyl)fluorene, 9,9-bis(cinnamoyloxymethyl)fluorene, 9-(benzoyloxymethyl)-9-(propylcarboxylmethyl)fluorene, 9,9-bis(propylcarboxylmethyl)fluorene, 9,9-bis(acryloxymethyl)fluorene, and 9,9-bis(neopentylcarboxylmethyl)fluorene. The above DOE compounds as exemplified, such as diol esters, are either commercially available, or can be synthesized by using well known methods in the art (e.g., the method as disclosed in CN1169845C).

In some embodiments, o-hydroxy benzoate can be used as the modifying agent of the magnesium halide adduct. The o-hydroxy benzoate is of the following formula (II):

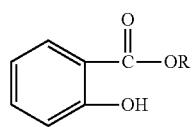

(II)

wherein, R is chosen from linear and branched $C_1$-$C_{12}$ alkyl, $C_3$-$C_{10}$ cycloalkyl, $C_6$-$C_{10}$ aryl or $C_7$-$C_{10}$ arylalkyl.

The $C_1$-$C_{12}$ alkyl group may be chosen, for example, from methyl, ethyl, propyl, isopropyl, butyl, isobutyl, t-butyl, pentyl, isopentyl, hexyl, and isohexyl. The $C_3$-$C_{10}$ cycloalkyl may be chosen, for example, from cyclopropyl, cyclobutyl, cyclopentyl and cyclohexyl. The $C_6$-$C_{10}$ aryl may be chosen, for example, from phenyl, o-benzyl, m-benzyl, p-benzyl, o-ethylphenyl, m-ethylphenyl, p-ethylphenyl and naphthyl. The $C_7$-$C_{10}$ arylalkyl may be chosen, for example, from indenyl, benzyl and phenylethyl. In one further embodiment, the o-hydroxy benzoate is chosen from methyl o-hydroxy benzoate, ethyl o-hydroxy benzoate, n-propyl o-hydroxy benzoate, isopropyl o-hydroxy benzoate, n-butyl o-hydroxy benzoate and isobutyl o-hydroxy benzoate.

4. Methanol

The magnesium halide adduct disclosed herein comprises methanol. This component may, for example, be generated in situ during a contact reaction by treating with dimethoxypropane in the process of preparing the magnesium halide adduct as described below.

According to some embodiments disclosed herein, the formula of the magnesium halide adduct may be expressed as MgXY-mROH-nCH$_3$OH-tM-qH$_2$O, wherein, MgXY and ROH have the respective definitions as described above; M represents the modifying agent, chosen from DOE and o-hydroxy benzoate; m is chosen from 1-2.4, n is chosen from 0.1-1.0, t is chosen from 0.0001-0.1, and q is chosen from 0-0.8.

In one embodiment, in the above formula of the magnesium halide adduct, m is chosen from 1.5-2.2, n is chosen from 0.3-0.8, t is chosen from 0.0002-0.01, and q is chosen from 0-0.5.

According to one embodiment disclosed herein, if o-hydroxy benzoate is used as the modifying agent, t may be chosen, for example, from 0.001-0.05, such as from 0.002-0.04.

In one embodiment disclosed herein, no matter which modifying agent, i.e., either the DOE or the o-hydroxy benzoate, is used, the magnesium halide adducts are spherical particles, and the spherical particles may have a diameter of 10-100 μm, such as 20-80 μm. In an embodiment, the olefin polymerization catalyst formed by using the magnesium halide adduct as a catalyst support has excellent anti-breaking property and hydrogen sensitivity. As disclosed herein, the mean diameter of the spherical particles may be measured by using a Mastersizer 2000 laser particle size analyzer.

Further disclosed herein is a catalyst component for olefin polymerization prepared by using the magnesium halide adduct. The catalyst component comprises at least one reaction product of the magnesium halide adduct, such as the spherical magnesium halide adduct, disclosed herein, at least one titanium compound and at least one internal electron donor compound. A titanium halide for example can be employed as the titanium compound herein.

As disclosed herein, in the catalyst component for olefin polymerization, the weight ratio of the titanium element, the magnesium element and the internal electron donor compound may be 1:(5-15):(2-15), such as 1:(6-13):(3-12).

As disclosed herein, there is no special limitation to the conditions of the contact reaction between, for example, the spherical magnesium halide adduct and titanium halide. In one embodiment, the conditions of the contact reaction may include: a reaction temperature ranging from 80-130° C., and a reaction time ranging from 0.5-10 h.

As disclosed herein, the titanium compound may be any titanium halide as conventionally used in the process of preparing an olefin polymerization catalyst. In some embodiments, the titanium compound may be chosen, for example, from compounds of formula Ti(ORa)$_{3-a}$Z$_a$ and/or Ti(ORa)$_{4-b}$Z$_b$, wherein: Ra is $C_1$-$C_{20}$ alkyl, Z is halogen, a is an integer of 1-3, and b is an integer of 1-4. In one embodiment, the titanium compound is chosen from titanium tetrachloride, titanium tetrabromide, titanium tetraiodide, tributoxy titanium chloride, dibutyoxy titanium dichloride, butyoxy titanium trichloride, triethoxy titanium chloride, diethoxy titanium dichloride, ethoxy titanium trichloride and titanium trichloride; for example, chosen from titanium tetrachloride and titanium tetrabromide.

As disclosed herein, the internal electron donor compound may be any internal electron donor compound as conventionally used in the process of preparing an olefin polymerization catalyst, which may be, for example, chosen from carboxylates, alcohol esters, ethers, ketones, amines and silanes, such as chosen from monohydric and polyhydric aliphatic carboxylates, monhydric and polyhydric aromatic carboxylates, dihydric alcohol esters and diethers.

The monohydric or polyhydric aliphatic carboxylates may be, for examples, one or more chosen from diethyl malonate, dibutyl malonate, diethyl 2,3-diisopropylsuccinate, di-n-butyl 2,3-diisopropylsuccinate, di-isobutyl 2,3-diisopropyl succinate, dimethyl 2,3-diisopropylsuccinate, diisobutyl 2,2-dimethylsuccinate, diisobutyl 2-ethyl-2-methylsuccinate, diethyl 2-ethyl-2-methylsuccinate, diethyl adipate, dibutyl adipate, diethyl sebacate, dibutyl sebacate, diethyl maleate, di-n-butyl maleate, diethyl naphthalene dicarboxylate and dibutyl naphthalene dicarboxylate.

The monhydric or polyhydric aromatic carboxylates may be, for example, one or more chosen from ethyl benzoate, diethyl phthalate, diisobutyl phthalate, di-n-butyl phthalate, diisooctyl phthalate, di-n-octyl phthalate, triethyl trimellitate, tributyl trimellitate, triethyl hemimellitate, tributyl hemimellitate, tetraethyl pyromellitate and tetrabutyl pyromellitate.

The dihydric alcohol ester may be a compound of the formula (I):

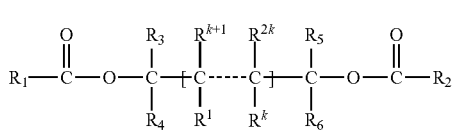

wherein, $R_1$ and $R_2$, $R_3$-$R_6$ and $R^1$-$R^{2k}$ as well as k, which may be identical or different, have one of the meanings as given above for the corresponding substituents and symbols in the formula (I).

In one embodiment, the dihydric alcohol esters may be chosen from compounds of formula (III):

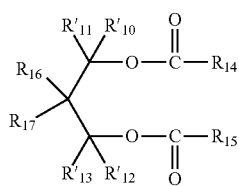

wherein, each of $R_{14}$, $R_{15}$, $R_{16}$, $R_{17}$, $R'_{10}$, $R'_{11}$, $R'_{12}$ and $R'_{13}$ has one of the meanings as given above for the respective corresponding substituents and symbols in the corresponding positions of formula (Ia).

In some embodiments, the dihydric alcohol esters as the internal electron donor compound may be, for example, one or more chosen from 1,3-propanediol dibenzoate, 2-methyl-1,3-propanediol dibenzoate, 2-ethyl-1,3-propanediol dibenzoate, 2,2-dimethyl-1,3-propanediol dibenzoate, (R)-1-phenyl-1,3-propanediol dibenzoate, 1,3-diphenyl-1,3-propanediol dibenzoate, 1,3-diphenyl-1,3-propanediol di-n-propionate, 1,3-diphenyl-2-methyl-1,3-propanediol dipropionate, 1,3-diphenyl-2-methyl-1,3-propanediol diacetate, 1,3-diphenyl-2,2-dimethyl-1,3-propanediol dibenzoate, 1,3-diphenyl-2,2-dimethyl-1,3-propanediol dipropionate, 1,3-di-t-butyl-2-ethyl-1,3-propanediol dibenzoate, 1,3-diphenyl-1,3-propanediol diacetate, 1,3-diisopropyl-1,3-propanediol di(4-butylbenzoate), 1-phenyl-2-amino-1,3-propanediol dibenzoate, 1-phenyl-2-methyl-1,3-butanediol dibenzoate, 2,4-pentanediol dibenzoate, 3-butyl-2,4-pentanediol dibenzoate, 3,3-dimethyl-2,4-pentanediol dibenzoate, 2,4-pentanediol di(p-chlorobenzoate), 2,4-pentanediol di(m-chloro benzoate), 2,4-pentanediol di(p-bromobenzoate), 2,4-pentanediol di(o-bromobenzoate), 2,4-pentanediol di(p-methylbenzoate), 2,4-pentanediol di(p-t-butylbenzoate), 2,4-pentanediol di(p-butylbenzoate), 2-methyl-1,3-pentanediol di(p-chlorobenzoate), 2-methyl-1,3-pentanediol di(p-methylbenzoate), 2-butyl-1,3-pentanediol di(p-methylbenzoate), 2-methyl-1,3-pentanediol di(p-t-butylbenzoate), 2-methyl-1,3-pentanediol neopentanoate, 2-methyl-1,3-pentanediol benzoate cinnamate, 2,2-dimethyl-1,3-pentanediol dibenzoate, 2,2-dimethyl-1,3-pentanediol benzoate cinnamate, 2-ethyl-1,3-pentanediol dibenzoate, 2-butyl-1,3-pentanediol dibenzoate, 2-allyl-1,3-pentanediol dibenzoate, 2-methyl-1,3-pentanediol dibenzoate, 2-ethyl-1,3-pentanediol dibenzoate, 2-propyl-1,3-pentanediol dibenzoate, 2-butyl-1,3-pentanediol dibenzoate, 1,3-pentanediol di(p-chlorobenzoate), 1,3-pentanediol di(m-chloro benzoate), 1,3-pentanediol di(p-bromobenzoate), 1,3-pentanediol di(o-bromobenzoate), 1,3-pentanediol di(p-methylbenzoate), 1,3-pentanediol di(p-t-butylbenzoate), 1,3-pentanediol di(p-butylbenzoate), 1,3-pentanediol benzoate cinnamate, 1,3-pentanediol dicinnamate, 1,3-pentanediol dipropionate, 2,2,4-trimethyl-1,3-pentanediol diisopropylformate, 1-trifluoromethyl-3-methyl-2,4-pentanediol dibenzoate, 2,4-pentanediol di-p-fluoromethyl benzoate, 2,4-pentanediol di(2-furanformate), 2-methyl-6-heptene-2,4-heptanediol dibenzoate, 3-methyl-6-heptene-2,4-heptanediol dibenzoate, 4-methyl-6-heptene-2,4-heptanediol dibenzoate, 5-methyl-6-heptene-2,4-heptanediol dibenzoate, 6-methyl-6-heptene-2,4-heptanediol dibenzoate, 3-ethyl-6-heptene-2,4-heptanediol dibenzoate, 4-ethyl-6-heptene-2,4-heptanediol dibenzoate, 5-ethyl-6-heptene-2,4-heptanediol dibenzoate, 6-ethyl-6-heptene-2,4-heptanediol dibenzoate, 3-propyl-6-heptene-2,4-heptanediol dibenzoate, 4-propyl-6-heptene-2,4-heptanediol dibenzoate, 5-propyl-6-heptene-2,4-heptanediol dibenzoate, 6-propyl-6-heptene-2,4-heptanediol dibenzoate, 3-butyl-6-heptene-2,4-heptanediol dibenzoate, 4-butyl-6-heptene-2,4-heptanediol dibenzoate, 5-butyl-6-heptene-2,4-heptanediol dibenzoate, 6-butyl-6-heptene-2,4-heptanediol dibenzoate, 3,5-dimethyl-6-heptene-2,4-heptanediol dibenzoate, 3,5-diethyl-6-heptene-2,4-heptanediol dibenzoate, 3,5-dipropyl-6-heptene-2,4-heptanediol dibenzoate, 3,5-dibutyl-6-heptene-2,4-heptanediol dibenzoate, 3,3-dimethyl-6-heptene-2,4-heptanediol dibenzoate, 3,3-diethyl-6-heptene-2,4-heptanediol dibenzoate, 3,3-dipropyl-6-heptene-2,4-heptanediol dibenzoate, 3,3-dibutyl-6-heptene-2,4-heptanediol dibenzoate, 3-ethyl-3,5-heptanediol dibenzoate, 4-ethyl-3,5-heptanediol dibenzoate, 3-propyl-3,5-heptanediol dibenzoate, 4-propyl-3,5-heptanediol dibenzoate, 3-butyl-3,5-heptanediol dibenzoate, 2,3-dimethyl-3,5-heptanediol dibenzoate, 2,4-dimethyl-3,5-heptanediol dibenzoate, 2,5-dimethyl-3,5-heptanediol dibenzoate, 4,4-dimethyl-3,5-heptanediol dibenzoate, 4,5-dimethyl-3,5-heptanediol dibenzoate, 4,6-dimethyl-3,5-heptanediol dibenzoate, 6,6-dimethyl-3,5-heptanediol dibenzoate, 2-methyl-3-ethyl-3,5-heptanediol dibenzoate, 2-methyl-4-ethyl-3,5-heptanediol dibenzoate, 2-methyl-5-ethyl-3,5-heptanediol dibenzoate, 3-methyl-4-ethyl-3,5-heptanediol dibenzoate, 3-methyl-5-ethyl-3,5-heptanediol dibenzoate, 4-methyl-3-ethyl-3,5-heptanediol dibenzoate, 4-methyl-4-ethyl-3,5-heptanediol dibenzoate, 9,9-bis(benzoyloxymethyl)fluorene, 9,9-bis((m-methoxybenzoyloxy)methyl)fluorene, 9,9-bis((m-chlorobenzoyloxy)methyl)fluorene, 9,9-bis((p-chlorobenzoyloxy)methyl)fluorene, 9,9-bis(cinnamoyloxymethyl)fluorene, 9-(benzoyloxymethyl)-9-(propylcarboxylmethyl)fluorene, 9,9-bis(propylcarboxylmethyl)fluorene, 9,9-bis(acryloxymethyl)fluorene, and 9,9-bis(neopentylcarboxylmethyl)fluorene. The dihydric alcohol esters as above listed may be commercially available, or can be synthesized by the method as disclosed in CN 1436796A.

The diethers may be chosen from compounds of formula (IV):

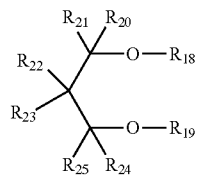

wherein, $R_{18}$ and $R_{19}$, which may be identical or different, may be independent of each other, chosen from linear and branched $C_1$-$C_{20}$ alkyl, $C_3$-$C_{20}$ cycloalkyl, $C_6$-$C_{20}$ aryl and $C_7$-$C_{20}$ arylalkyl; $R_{20}$-$R_{25}$, which may be identical or different, may be independent of each other, chosen from hydrogen, halogen, linear or branched $C_1$-$C_{20}$ alkyl, $C_3$-$C_{20}$ cycloalkyl, $C_8$-$C_{20}$ aryl, and $C_7$-$C_{20}$ arylalkyl; or two or more of $R^{20}$-$R^{25}$ are linked to form a ring structure. In one embodiment, $R_{18}$ and $R_{19}$, which are identical or different, are independent of each other, chosen from linear and branched $C_1$-$C_{10}$ alkyl; $R_{20}$, $R_{21}$, $R_{24}$ and $R_{25}$ are all hydrogen; $R_{22}$ and $R_{23}$, which are identical or different, are independent of each other, chosen from linear and branched $C_1$-$C_{18}$ alkyl, $C_3$-$C_{18}$ cycloalkyl, $C_6$-$C_{18}$ aryl, and $C_7$-$C_{18}$ arylalkyl; or $R_{22}$ and $R_{23}$ are linked to form a ring structure.

As disclosed herein, the diethers may be, for example, one or more chosen from 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2-isobutyl-2-isopropyl-1,3-dimethoxypropane, 2-(1-methylbutyl)-2-isopropyl-1,3-dimethoxypropane, 2-isopropyl-2-isopentyl-1,3-dimethoxypropane, 2-phenyl-2-isopropyl-1,3-dimethoxypropane, 2-phenyl-2-sec-butyl-1,3-dimethoxypropane, 2-benzyl-2-isopropyl-1,3-dimethoxypropane, 2-cyclopentyl-2-isopropyl-1,3-dimethoxypropane, 2-cyclopentyl-2-sec-butyl-1,3-dimethoxypropane, 2-cyclohexyl-2-isopropyl-1,3-dimethoxypropane, 2-cyclohexyl-2-sec-butyl-1,3-dimethoxypropane, 2-isopropyl-2-sec-butyl-1,3-dimethoxypropane, 2-cyclohexyl-2-cyclohexylmethyl-1,3-dimethoxypropane, and 9,9-dimethoxymethylfluorene. In one embodiment, the diethers are one or more chosen from 2-isopropyl-2-isopentyl-1,3-dimethoxypropane and 9,9-dimethoxymethylfluorene.

Further disclosed herein is a catalyst comprising the catalyst component for olefin polymerization. The catalyst comprises: (1) the catalyst component disclosed herein for olefin polymerization; (2) at least one alkyl aluminum compound; and (3) optionally at least one external electron donor compound.

The catalyst for olefin polymerization disclosed herein comprises the catalyst component for olefin polymerization discloses herein. Then, the catalyst for olefin polymerization disclosed herein, in the form of particles having smooth surface and regular morphology, can have relatively strong anti-breaking property during polymerization when used as a catalyst for olefin polymerization, can exhibit not only relatively high polymerization activity, but also excellent hydrogen sensitivity and high stereospecificity, and can lead to the formation of polymer particles with good morphology. Therefore, there are not special limitations to the types and amounts of the alkyl aluminum compound and the external electron donor compound used in the catalyst for olefin polymerization disclosed herein.

The alkyl aluminum compound can be any alkyl aluminum compound as commonly used in the art. For example, the alkyl aluminum compound may be one or more chosen from triethyl aluminum, triisobutyl aluminum, tri-n-butyl aluminum, tri-n-hexyl aluminum, monochloro diethyl aluminum, monochloro diisobutyl aluminum, monochloro di-n-butyl aluminum, monochloro di-n-hexyl aluminum, dichloro monoethyl aluminum, dichloro monoisobutyl aluminum, dichloro mono-n-butyl aluminum and dichloro mono-n-hexyl aluminum.

The external electron donor compound may be any external electron donor compound as commonly used in the art. For example, the external electron donor compound may be one or more chosen from carboxylic acid, anhydrides, esters, ketones, ethers, alcohols, organic phosphorus compounds and organic silicon compounds. Preferably, the external electron donor compound is an organic silicon compound. Examples of the organic silicon compound may include, but not limited to, cyclohexylmethyldimethoxy silane, diisopropyldimethoxy silane, di-n-butyldimethoxy silane, diisobutyldimethoxy silane, diphenyldimethoxy silane, methyl-t-butyldimethoxy silane, dicyclopentyldimethoxy silane, 2-ethylpiperidinyl-2-t-butyldimethoxy silane, (1,1,1-trifluoro-2-propyl)-2-ethylpiperidinyldimethoxy silane and (1,1,1-trifluoro-2-propyl)-methyldimethoxy silane.

In the catalyst for olefin polymerization, the molar ratio of the catalyst component for olefin polymerization measured as the titanium element to the alkyl aluminum compound measured as the aluminum element is 1:1-1:2000, such as 1:10-1:500, further such as 1:20-1:500, even further such as 1:20-1:400; the molar ratio of the external electron donor compound to the alkyl aluminum compound measured as the aluminum element is 1:2-1:200, such as 1:2.5-1:100, further such as 1:10-1:80.

Further disclosed herein is a process for preparing the magnesium halide adduct. The process for preparing, for example, the spherical magnesium halide adduct may comprise:

(1) mixing at least one compound of the formula MgXY, at least one compound of the formula ROH and optionally at least one inert liquid medium, and heating the resultant mixture under stirring to obtain a melt of magnesium halide adduct;

(2) adding the melt of magnesium halide adduct, after shear dispersion, to at least one cooling medium, to form spherical solid particles;

(3) allowing the spherical solid particles and dimethoxypropane to carry out a contact reaction in at least one first inert dispersing medium; and (4) allowing the product obtained from the contact reaction of step (3) to carry out a contact reaction with at least one compound chosen from DOE and o-hydroxy benzoate in at least one second inert dispersing medium, to obtain the spherical magnesium halide adduct;

wherein, the compound of the formula MgXY, the compound of the formula ROH, DOE and o-hydroxy benzoate are all as defined above.

In the process for preparing the spherical magnesium halide adduct, in the step (1), the amounts of the compound of the formula MgXY and the compound of the formula ROH may be suitably selected according to the proportions of various components in the spherical magnesium halide adduct. For example, the molar ratio of the amount of the compound of the formula MgXY to the amount of the compound of the formula ROH ranges from 1:1-1:8, such as from 1:2-1:6. The compound of the formula MgXY and the compound of the formula ROH are as defined above.

In the process for preparing the spherical magnesium halide adduct, in the step (1), the purpose of heating is for enabling the magnesium halide, alcohol and inert liquid medium to form a melt of adduct of magnesium halide and alcohol. The heating conditions are not limited, and may be determined according to the magnesium halide compound used. In some embodiments, the heating conditions may include: a heating temperature above 80° C., and a heating time above 1 h. According to one embodiment, the heating conditions include: the heating temperature ranging from 100-140° C., and the heating time ranging from 1-5 h.

In the process for preparing the spherical magnesium halide adduct, the inert liquid medium used in the step (1) may be any liquid medium as commonly used in the art that does not undergo chemical reactions with the spherical magnesium halide adduct; the inert liquid medium may comprise at least one compound chosen, for example, from organic silicon compounds and aliphatic hydrocarbon compounds. In some embodiments, the inert liquid medium may be one or more chosen from n-pentane, n-hexane, n-heptane, petroleum ether, gasoline, methylsilicone oil, ethylsilicone oil, methylethylsilicone oil, phenylsilicone oil, methylphenylsilicone oil, kerosene, paraffin oil, vaseline and white oil. In some embodiments, the inert liquid medium may be one or more chosen from white oil and silicone oil. There is no special limitation to the amount of the inert liquid medium used in the process. In some embodiments, the inert liquid medium is used in an amount of 0.8-10 L relative to 1 mole of the at least one compound of formula MgXY (i.e., magnesium halide added in the step (1)) measured as the magnesium element.

In the process for preparing the spherical magnesium halide adduct, in the step (2), the shear dispersion may be conducted by using a conventional method, for example, the high speed stirring method as disclosed in CN1330086C (i.e., stirring the magnesium halide adduct in an inert liquid medium at a speed of 2000-5000 rpm); the dispersion by rotating a mixture of magnesium halide adduct and inert liquid medium in a high gravity bed as disclosed in CN1267508C (the rotation speed may be ranging from 1000-3000 rpm); the output of a mixture of magnesium halide adduct and silicone oil and white oil with an emulsifying apparatus at a speed of 1500-8000 rpm as disclosed in CN1463990A; and/or the emulsification of a mixture containing magnesium halide adduct by using a spraying method as disclosed in U.S. Pat. No. 6,020,279.

In the process for preparing the spherical magnesium halide adduct, in the step (2), adding the melt of magnesium halide adduct, after shear dispersion, to at least one cooling medium can serve the purpose of quenching the melt of magnesium halide adduct to form spherical solid particles. As disclosed herein, the cooling medium is chosen, for example, from inert hydrocarbon solvents, such as low boiling inert hydrocarbon solvents, for example, one or more chosen from pentane, hexane, heptane, gasoline and petroleum ether. The temperature of the cooling medium may range, for example, from −40° C. to 0° C., such as from −30° C. to −10° C.

In the process for preparing the spherical magnesium halide adduct, after the quenching and before allowing the spherical solid particles and dimethoxypropane to carry out the contact reaction, the process for preparing the spherical magnesium halide adduct further comprises, for example, washing the solid particles obtained from the quenching with at least one first inert organic solvent for 1-10 times. The first inert organic solvent may be, for example, one or more chosen from pentane, hexane, heptane, gasoline and petroleum ether.

In the process for preparing the spherical magnesium halide adduct, there is no special limitation to the conditions of the contact reaction in step (3). For example, the conditions of the contact reaction are as follows: the reaction temperature ranges from 40-65° C., such as from 45-60° C.; the reaction time ranges from 1-5 h, such as from 2-4 h; in relative to 1 mole of the compound of the formula MgXY measured as the magnesium element (i.e., magnesium halide as added in step (1)), the amount of dimethoxypropane added in step (3) ranges from 0.1-1.5 moles, such as from 0.2-1 mole. Under the above contact reaction conditions, the morphology of the spherical magnesium halide adduct as finally prepared can be further improved.

In the process for preparing the spherical magnesium halide adduct, the first inert dispersing medium in step (3) may be, for example, one or more chosen from pentane, hexane and heptane.

In the process for preparing the magnesium halide adduct, in order to obtain spherical particles of the magnesium halide adduct, the process may further comprise filtering the product obtained after the contact reaction of step (3), and washing it with at least one second inert organic solvent for 1-10 times. The second inert organic solvent may be identical to or different from the aforesaid first inert organic solvent.

In the process for preparing the spherical magnesium halide adduct, there is no special limitation to the conditions of the contact reaction in step (4), as long as they are capable of forming the spherical magnesium halide adduct. For example, the conditions of the contact reaction are as follows: the reaction temperature ranges from 40-65° C., such as from 45-60° C.; the reaction time ranges from 1-5 h, such as from 2-4 h. In the case of contacting the product, which is obtained from the contact reaction of the spherical magnesium halide adduct particles and dimethoxypropane, with a polyol ester DOE, the molar ratio of the polyol ester DOE to the compound of the formula MgXY may be ranging from 0.01:1-0.5:1, such as from 0.02:1-0.2:1. In the case of contacting the product, which is obtained from the contact reaction of the spherical magnesium halide adduct particles and dimethoxypropane, with o-hydroxy benzoate, the molar ratio of the o-hydroxy benzoate to the compound of the formula MgXY may be ranging from 0.001:1-0.05:1, such as from 0.002:1-0.04:1. In some embodiments, the polyol ester DOE is chosen from polyol esters of the above formula (I), such as diol esters represented by the above formula (Ia).

In the process for preparing the spherical magnesium halide adduct, there is no special limitation to the second inert dispersing medium in step (4), as long as it is capable of dissolving the polyol ester DOE or o-hydroxy benzoate. The second inert dispersing medium may be identical to or different from the first inert medium used in step (3). The first and second inert dispersing media may be independently, for example, one or more chosen from pentane, hexane and heptane.

In the process for preparing the magnesium halide adduct, in order to obtain spherical particles of the magnesium halide adduct, the process may further comprise filtering the product obtained after the contact reaction of step (4), washing it with at least one third inert organic solvent for 1-10 times, and then drying. The third inert organic solvent may be identical to or different from the aforesaid first or second inert organic solvent.

Further disclosed herein is a process for preparing the catalyst component. The catalyst component is prepared by the following step on the basis of, for example, the spherical magnesium halide adduct as obtained above:

(5) reacting the spherical magnesium halide adduct with at least one titanium compound, and adding at least one internal electron donor compound before, during and/or after the reaction of the spherical magnesium halide adduct with the titanium compound. The suitable internal electron donor compound includes those as described above.

In the process for preparing the catalyst component useful for olefin polymerization, steps (1) through (4) are identical with steps (1) through (4) in the process for preparing the spherical magnesium halide adduct as described above.

In the process for preparing the catalyst component useful for olefin polymerization, the reaction of the spherical magnesium halide adduct with the titanium compound in step (5) can be carried out according to the methods as described in the art. In some embodiments, for example, in step (5), the reaction of the spherical magnesium halide adduct with the titanium compound comprises: cooling the titanium compound till below 0° C. (such as cooling to a temperature ranging from −5° C. to −25° C.), adding the spherical magnesium halide adduct obtained in step (4), mixing under stirring at this temperature for 10-60 min, then increasing the temperature to the reaction temperature (i.e., about 80-130° C.), and maintaining at this reaction temperature for 0.5-10 h. In the process for preparing the catalyst component useful for olefin polymerization, the internal electron donor compound is added before, during and/or after the reaction of the spherical magnesium halide adduct with the titanium compound, such as before the reaction of the spherical magnesium halide adduct with the titanium compound. Adding the internal electron donor compound before the reaction of the spherical magnesium halide adduct with the titanium compound refers to adding the internal electron donor compound within the time period between adding the spherical magnesium halide adduct to the reactor and increasing the temperature to the reaction temperature.

In the process for preparing the catalyst component useful for olefin polymerization, in step (5), the molar ratio of the spherical magnesium halide adduct measured as the magnesium element, the titanium compound measured as the titanium element, and the internal electron donor compound may be 1:(20-150):(0.005-1), such as 1:(30-120):(0.01-0.6).

In the process for preparing the catalyst component useful for olefin polymerization, the titanium compound and the internal electron donor compound are as described above, respectively.

Further disclosed herein is use of the catalyst component in a catalyst for olefin polymerization.

Even further disclosed herein is use of the catalyst in olefin polymerization.

Even further disclosed herein is a process of olefin polymerization, comprising: contacting at least one olefin with the catalyst prepared according to the present disclosure under olefin polymerization conditions, wherein the catalyst comprises: (1) the catalyst component disclosed herein for olefin polymerization; (2) at least one alkyl aluminum compound; and (3) optionally at least one external electron donor compound.

According to the process of olefin polymerization disclosed herein, a polymer having excellent particle morphology can be prepared by using the catalyst for olefin polymerization disclosed herein. There is no special limitation to the olefin polymerization conditions and the olefin used in the process of olefin polymerization disclosed herein.

The at least one olefin may be, for example, chosen from ethylene, propylene, 1-butene, 2-butene, 2-methyl-1-butene, 3-methyl-1-butene, 2-methyl-2-butene, 1-pentene, 2-pentene, 1-hexene and styrene, such as chosen from ethylene, propylene, 1-butene, 2-butene and styrene.

According to the process of olefin polymerization disclosed herein, the olefin polymerization can be carried out in accordance with a conventional method in the art. For example, the olefin polymerization can be bulk polymerization, gas phase polymerization or slurry polymerization. According to the process of olefin polymerization disclosed herein, the olefin polymerization conditions can be conventional conditions in the art. For example, the polymerization temperature may be ranging from 0-150° C., such as from 60-90° C.; the polymerization pressure may be a normal pressure or an elevated pressure.

The following examples are provided to further illustrate the present disclosure. However, it should be understood that these examples are only used for illustrating and interpreting the present disclosure, but are not used for limiting the present disclosure.

EXAMPLES

Part I: Using DOE as a Modifying Agent

Example 1

This example is intended to illustrate the catalyst component for olefin polymerization and its preparation process as well as the catalyst for olefin polymerization and its use disclosed herein.

(1) Preparation of Spherical Magnesium Chloride Adduct

In a 300 L autoclave, 90 L white oil, 90 L silicone oil, 9.0 kg (94.7 mol) magnesium chloride and 14.5 L (249.0 mol) ethanol were added, heated under stirring up to 125° C., and further stirred at this temperature for 2.5 h. Thereafter, the resulting mixed liquid was transferred via a high gravity rotation bed to hexane that had been previously cooled down to −30° C. After removing the liquid by filtration, the filter cake was washed with hexane for 5 times, and dried under vacuum at 40° C. for 2 h, to obtain 18 kg of a solid substance (i.e., an alcohol adduct of magnesium chloride).

In a 1.6 L reactor, 900 mL hexane, and 90 g of the solid substance as above prepared were added, followed by the addition of a solution of 45 ml dimethoxypropane dissolved in 180 ml hexane (the content of dimethoxypropane therein was 0.37 mol). Then, the system was heated up to 60° C., and allowed to react under stirring at this temperature for 3 h. The reaction product was subjected to filter pressing. The filter cake was washed twice with hexane, to which 800 ml hexane and then 8 ml 2,4-pentanediol dibenzoate dissolved in 100 ml hexane were added. Then, the system was heated up to 60° C., and allowed to react at this temperature under stirring for 2 h. The reaction product was subjected to filter pressing. The filter cake was washed with hexane for 5 times, and then dried at 60° C. for 4 h, to obtain a spherical magnesium chloride adduct.

The Mg content in the spherical magnesium chloride adduct was measured according to compleximetry, and the contents of ethanol, methanol and 2,4-pentanediol dibenzoate in the spherical magnesium chloride adduct were respectively measured according to liquid chromatography.

The results showed that the molar ratio of magnesium chloride, ethanol, methanol and 2,4-pentanediol dibenzoate in the spherical magnesium chloride adduct was 1:1.6:0.6:0.0005. As measured using a Mastersizer 2000 laser granulometer (as manufactured by Malvern Instruments Ltd), the average diameter of the magnesium chloride adduct particle was 43 µm.

(2) Preparation of the Catalyst Component for Olefin Polymerization

Figure 3:
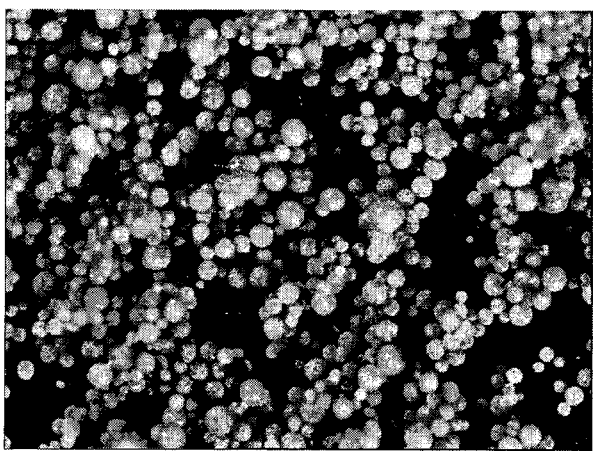
FIG. 3 shows an optical microscopic photograph of the catalyst component particles for olefin polymerization prepared in Example 1.

In a 2000 mL glass reaction bottle, 500 ml titanium tetrachloride was added and cooled down to −20° C., to which 40 g of the magnesium chloride adduct as prepared in step (1) of Example 1 was added. Then, the system was heated up to 110° C., during which 6.5 mL of 2,4-pentanediol dibenzoate and 6.5 mL of 2-isopropyl-2-isopentyl-1,3-dimethoxypropane were added. After maintaining at 110° C. for 30 min, the liquid was removed by filtration. The filter cake was washed twice with titanium tetrachloride, and washed with hexane for 5 times, and then dried under vacuum at 40° C. for 2 h, to obtain a catalyst component C1 for olefin polymerization. The content of Ti element in the catalyst component was measured according to spectrophotography by using a grating spectrophotometer; the content of Mg element in the catalyst component was measured according to compleximetry; and the contents of 2,4-pentanediol dibenzoate and 2-isopropyl-2-isopentyl-1,3-dimethoxypropane in the catalyst component were respectively measured according to liquid chromatography. The results showed that the mass ratio of Ti, Mg, 2,4-pentanediol dibenzoate and 2-isopropyl-2-isopentyl-1,3-dimethoxypropane in the catalyst component was 1:4.5:3.1:1.2. As observed using a Nikon Eclipse E200 type optical microscope-JVC color video camera, the optical microphotograph of the catalyst component C1 was shown in FIG. 3.

(3) Polymerization of Propylene

In a 5 L autoclave, after sweeping with a $N_2$ stream, 1 mL of a solution of triethylaluminum in hexane (the concentration of triethylaluminum was 0.5 mmol/mL), 0.1 mL of a solution of cyclohexylmethyldimethoxy silane (CHMMS) in hexane (the concentration of CHMMS was 0.1 mmol/mL), 10 mL of anhydrous hexane and 4 mg of the catalyst component C1 were introduced in the $N_2$ stream. After closing the autoclave, 2.0 L of hydrogen (standard volume) and 2.3 L of liquid propylene were added, heated up to 70° C., and allowed to react at this temperature for 1 h.

Example 2

The preparation of the magnesium chloride adduct and of the catalyst component for olefin polymerization, and the polymerization of propylene were carried out according to the same processes as described in Example 1, except for that the amount of hydrogen added during the polymerization of propylene was 6.5 L.

Comparative Example 1

(1) Preparation of Magnesium Chloride Adduct

In a 300 L autoclave, 90 L white oil, 90 L silicone oil, 9.0 kg magnesium chloride and 14.5 L ethanol were added, heated under stirring up to 125° C., and further stirred at this temperature for 2.5 h. Thereafter, the resulting mixed liquid was transferred via a high gravity rotation bed to hexane that had been previously cooled down to −30° C. After removing the liquid by filtration, the filter cake was washed with hexane for 5 times, and dried to obtain 18 kg of a solid substance (i.e., an alcohol adduct of magnesium chloride).

(2) Preparation of the Catalyst Component for Olefin Polymerization

The catalyst component for olefin polymerization was prepared using the same process as described in Example 1, except for that the magnesium chloride adduct as prepared in step (1) of Comparative Example 1 was used to obtain a catalyst component DC1.

(3) Polymerization of Propylene

The polymerization of propylene was carried out using the same process as described in Example 1, except for that the catalyst component as prepared in step (2) of Comparative Example 1 was used.

Comparative Example 2

The preparation of the magnesium chloride adduct and of the catalyst component for olefin polymerization, and the polymerization of propylene were carried out according to the same processes as described in Comparative Example 1, except for that the amount of hydrogen added during the polymerization of propylene was 6.5 L.

Example 3

This example is intended to illustrate the catalyst component for olefin polymerization and its preparation process as well as its use in olefin polymerization as provided in the present invention.

(1) Preparation of Magnesium Chloride Adduct

The magnesium chloride adduct was prepared using the same process as described in Example 1, except for that the amount of dimethoxypropane was 10 mL.

The Mg content in the spherical magnesium chloride adduct was measured according to compleximetry, and the contents of ethanol, methanol and 2,4-pentanediol dibenzoate in the spherical magnesium chloride adduct were respectively measured according to liquid chromatography. The results showed that the molar ratio of magnesium chloride, ethanol, methanol and 2,4-pentanediol dibenzoate in the spherical magnesium chloride adduct was 1:2.2:0.2:0.0002. As measured using a Mastersizer 2000 laser granulometer (as manufactured by Malvern Instruments Ltd), the average diameter of the magnesium chloride adduct particle was 43 µm.

(2) Preparation of the Catalyst Component for Olefin Polymerization

The catalyst component for olefin polymerization was prepared using the same process as described in Example 1, except for that the magnesium chloride adduct as prepared in step (1) of Example 3 was used to obtain a catalyst component C2. The content of Ti element in the catalyst component was measured according to spectrophotography by using a grating spectrophotometer; the content of Mg element in the catalyst component was measured according to compleximetry; and the contents of 2,4-pentanediol dibenzoate and 2-isopropyl-2-isopentyl-1,3-dimethoxypropane in the catalyst component were respectively measured according to liquid chromatography. The results showed that the mass ratio of Ti, Mg, 2,4-pentanediol dibenzoate and 2-isopropyl-2-isopentyl-1,3-dimethoxypropane in the catalyst component was 1:7.2:3.6:2.

(3) Polymerization of Propylene

The polymerization of propylene was carried out using the same process as described in Example 1, except for that the catalyst component as prepared in step (2) of Example 3 was used.

Example 4

The preparation of the magnesium chloride adduct and of the catalyst component for olefin polymerization, and the polymerization of propylene were carried out according to the same processes as described in Example 3, except for that the amount of hydrogen added during the polymerization of propylene was 6.5 L.

Test Example 1

Using a Nikon Eclipse E200 type optical microscope-JVC color video camera, the magnesium chloride adducts as prepared in Example 1 and Comparative Example 1 were observed. The optical microphotograph of the magnesium chloride adduct as prepared in Example 1 was shown in FIG. 1, and the optical microphotograph of the magnesium chloride adduct as prepared in Comparative Example 1 was shown in FIG. 2.

Figure 2:
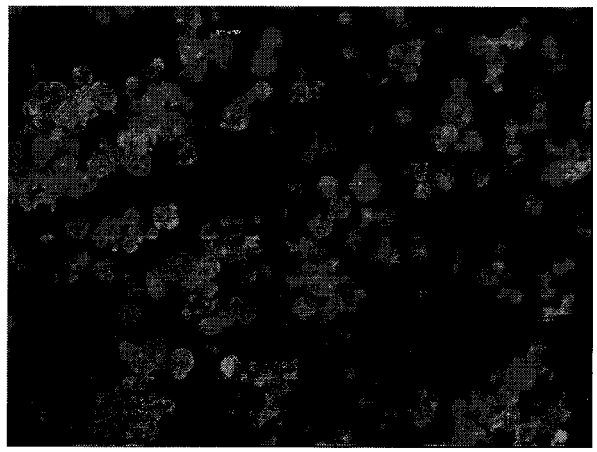
FIG. 2 shows an optical microscopic photograph of the magnesium halide adduct prepared in Comparative Example 1.

As can be seen from FIG. 1 and FIG. 2, the particles of the magnesium chloride adduct as prepared in Example 1 were featured with a regular morphology, an essentially spherical shape, and a relatively narrow particle size distribution, and were essentially free of non-spherical particles or obvious broken particles, whereas the particles of the magnesium chloride adduct as prepared in Comparative Example 1 included obvious broken particles.

Test Example 2

(1) Melt index (MI) of polymer was measured according to the method of ASTM D1238-99.

(2) Isotacticity of polymer was measured by a heptane extraction method carried out as follows: 2 g of a dry polymer sample was extracted with boiling heptane in an extractor for 6 h, then the residual substance was dried to a constant weight. The ratio of the weight of the residual polymer (g) to 2 g of the dry polymer sample was regarded as isotacticity.

The results as obtained according to the above methods are shown in the below Table 1.

TABLE 1

| Catalyst component | Amount of $H_2$ (L) | Activity (kgPP/gcat) | Isotacticity of polymer (%) | MI of polymer (g/10 min) |
|---|---|---|---|---|
| Catalyst component C1 | 2.0 | 100 | 98.1 | 7 |
|  | 6.5 | 118 | 97.1 | 60 |
| Catalyst component DC1 | 2.0 | 123 | 98.5 | 4 |
|  | 6.5 | 134 | 96.9 | 50 |
| Catalyst component C2 | 2.0 | 114 | 98.3 | 5 |
|  | 6.5 | 110 | 97.0 | 59 |

As can be seen from the data in Table 1, the catalyst, which was prepared by using the magnesium chloride adduct prepared according to the process of the present invention as a catalyst support, had a relatively good hydrogen sensitivity in polymerization of propylene. Specifically, by comparing the melting indexes of the polymers as prepared from the polymerization of propylene using the catalyst components C1 and C2 with the melting index of the polymer as prepared from the polymerization of propylene using the catalyst component DC1, it could be seen that the catalyst components C1 and C2 resulted in a better hydrogen sensitivity than the catalyst component DC1.

Test Example 3

The polymers as prepared in Example 1 and Comparative Example 1 were screened, the results being given below in Table 2.

The screen adopted in this test example was a national standard screen having the following specification:
10 screen mesh corresponding to sieve pore size 1.651 mm,
20 screen mesh corresponding to sieve pore size 0.850 mm,
40 screen mesh corresponding to sieve pore size 0.425 mm,
60 screen mesh corresponding to sieve pore size 0.250 mm,
80 screen mesh corresponding to sieve pore size 0.180 mm,
100 screen mesh corresponding to sieve pore size 0.150 mm,

TABLE 2

| Example | >10 meshes (wt %) | 10-20 meshes (wt %) | 20-40 meshes (wt %) | 40-60 meshes (wt %) | 60-80 meshes (wt %) | 80-100 meshes (wt %) | <100 meshes (wt %) |
|---|---|---|---|---|---|---|---|
| Example 1 | 45.1 | 48.2 | 5.1 | 0.7 | 0.4 | 0.1 | 0.3 |
| Comparative Example 1 | 58.9 | 34.7 | 3.7 | 1.2 | 0.8 | 0.3 | 0.4 |

As can be seen from the data in Table 2, the propylene polymer, as prepared during the polymerization of propylene in the presence of the catalyst which was prepared by using the magnesium chloride adduct according to the present invention as a catalyst support, had a relatively low content of fine powder (the particles having a particle size of above 80 meshes were generally regarded as fine powders). Clearly, the catalyst as prepared using the magnesium chloride adduct provided by the present invention was not easy to break, and thereby resulted in a relatively good anti-breaking property.

Part II: Using o-Hydroxy Benzoate as a Modifying Agent

Example 5

This example is used to illustrate the catalyst component for olefin polymerization and its preparation process as well as the catalyst for olefin polymerization and its use as provided in the present invention.

(1) Preparation of Spherical Magnesium Chloride Adduct

In a 300 L autoclave, 90 L white oil, 90 L silicone oil, 9.0 kg magnesium chloride and 14.5 L (249.0 mol) ethanol were added, heated under stirring up to 125° C., and further stirred at this temperature for 2.5 h. Thereafter, the resulting mixed liquid was transferred, after sufficient shear dispersion with a high gravity rotation bed, to hexane that had been previously cooled down to −30° C. After removing the liquid by filtration, the solid was washed with hexane for 5 times, and dried to obtain 18 kg of a solid substance (i.e., an alcohol adduct of magnesium chloride).

In a 1.6 L reactor, 900 mL hexane, and 90 g of the solid substance as above prepared were added, followed by the addition of a solution of 45 ml dimethoxypropane dissolved in 180 ml hexane (the content of dimethoxypropane therein was 0.37 mol). Then, the system was heated up to 60° C., and allowed to react under stirring at this temperature for 3 h. The reaction product was subjected to filter pressing, and the filter cake was washed twice with hexane. The washed solid substance was put in a reactor, to which 800 ml hexane and then 7 ml ethyl o-hydroxy benzoate dissolved in 100 ml hexane (the content of ethyl o-hydroxy benzoate was 0.048 mol) were added. Then, the system was heated up to 60° C., and allowed to react at this temperature for 2 h. The reaction product was subjected to filter pressing. The filter cake was washed with hexane for 5 times, and then dried to obtain a spherical magnesium chloride adduct.

The Mg content in the spherical magnesium chloride adduct was measured according to compleximetry, and the contents of ethanol, methanol and ethyl o-hydroxy benzoate in the spherical magnesium chloride adduct were respectively measured according to liquid chromatography. The results showed that the molar ratio of magnesium chloride, ethanol, methanol and ethyl o-hydroxy benzoate in the spherical magnesium chloride adduct was 1:2.1:0.7:0.005. As measured using a Mastersizer 2000 laser granulometer (as manufactured by Malvern Instruments Ltd), the average diameter of the spherical magnesium chloride adduct particle was 40 µm.

(2) Preparation of the Catalyst Component for Olefin Polymerization

In a 2000 mL glass reaction bottle, 500 ml titanium tetrachloride was added and cooled down to −20° C., to which 40 g of the magnesium chloride adduct as prepared in step (1) of Example 5 was added, followed by stirring at −20° C. for 30 min. Then, the system was slowly heated up to 110° C., during which 7.5 mL of diisobutyl phthalate was added. After maintaining at 110° C. for 30 min, the liquid was removed by filtration. The filter cake was washed twice with titanium tetrachloride, and washed with hexane for 5 times, and then dried to obtain a catalyst component C3 for olefin polymerization. The content of Ti element in the catalyst component was measured according to spectrophotography by using a grating spectrophotometer; the content of Mg element in the catalyst component was measured according to compleximetry; and the content of diisobutyl phthalate in the catalyst component was measured according to liquid chromatography. The results showed that the mass ratio of Ti, Mg and diisobutyl phthalate in the catalyst component was 1:7.5:5.2.

(3) Polymerization of Propylene

In a 5 L autoclave, after sweeping with a $N_2$ stream, 5 mL of a solution of triethylaluminum in hexane (the concentration of triethylaluminum was 0.5 mmol/mL), 1 mL of a solution of cyclohexylmethyldimethoxy silane (CHMMS) in hexane (the concentration of CHMMS was 0.1 mmol/mL), 10 mL of anhydrous hexane and 8 mg of the catalyst component C3 were introduced in the $N_2$ stream. After closing the autoclave, 1.5 L of hydrogen (standard volume) and 2.3 L of liquid propylene were added, heated up to 70° C., and allowed to react at this temperature for 1 h.

Example 6

The preparation of the magnesium chloride adduct and of the catalyst component for olefin polymerization, and the polymerization of propylene were carried out according to the same processes as described in Example 5, except for that the amount of hydrogen added during the polymerization of propylene was 5.0 L.

Comparative Example 3

(1) Preparation of Magnesium Chloride Adduct

In a 300 L autoclave, 90 L white oil, 90 L silicone oil, 9.0 kg magnesium chloride, 14.5 L ethanol and 1.8 L (14.7 mol) dimethoxypropane were added, heated under stirring up to 125° C., and further stirred at this temperature for 2.5 h. Thereafter, the resulting mixed liquid was transferred, after sufficient shear dispersion with a high gravity rotation bed, to hexane that had been previously cooled down to −30° C. After removing the liquid by filtration, the filter cake was washed with hexane for 5 times, and dried to obtain a magnesium chloride adduct.

(2) Preparation of the Catalyst Component for Olefin Polymerization

The catalyst component for olefin polymerization was prepared using the same process as described in Example 5, except for that the magnesium chloride adduct as prepared in step (1) of Comparative Example 3 was used to obtain a catalyst component DC2.

(3) Polymerization of Propylene

The polymerization of propylene was carried out using the same process as described in Example 5.

Comparative Example 4

The preparation of the magnesium chloride adduct and of the catalyst component for olefin polymerization, and the polymerization of propylene were carried out according to the same processes as described in Comparative Example 3, except for that the amount of hydrogen added during the polymerization of propylene was 5.0 L.

Comparative Example 5

(1) Preparation of Magnesium Chloride Adduct

In a 300 L autoclave, 90 L white oil, 90 L silicone oil, 9.0 kg magnesium chloride and 14.5 L ethanol were added, heated under stirring up to 125° C., and further stirred at this temperature for 2.5 h. Thereafter, the resulting mixed liquid was transferred, after sufficient shear dispersion with a high gravity rotation bed, to hexane that had been previously cooled down to −30° C. After removing the liquid by filtration, the filter cake was washed with hexane for 5 times, and dried to obtain a magnesium chloride adduct.

(2) Preparation of the Catalyst Component for Olefin Polymerization

The catalyst component for olefin polymerization was prepared using the same process as described in Example 5, except for that the magnesium chloride adduct as prepared in step (1) of Comparative Example 5 was used to obtain a catalyst component DC3.

(3) Polymerization of Propylene

The polymerization of propylene was carried out using the same process as described in Example 5.

Comparative Example 6

The preparation of the magnesium chloride adduct and of the catalyst component for olefin polymerization, and the polymerization of propylene were carried out according to the same processes as described in Comparative Example 5, except for that the amount of hydrogen added during the polymerization of propylene was 5.0 L.

Test Example 4

Figure 6:
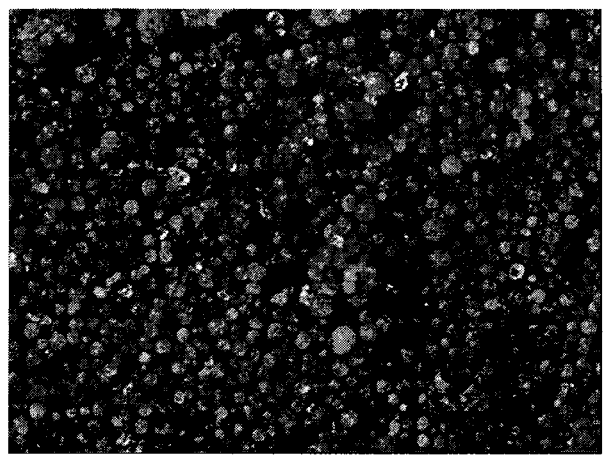
FIG. 6 shows an optical microscopic photograph of the olefin polymerization catalyst prepared in Example 5.
Figure 7:
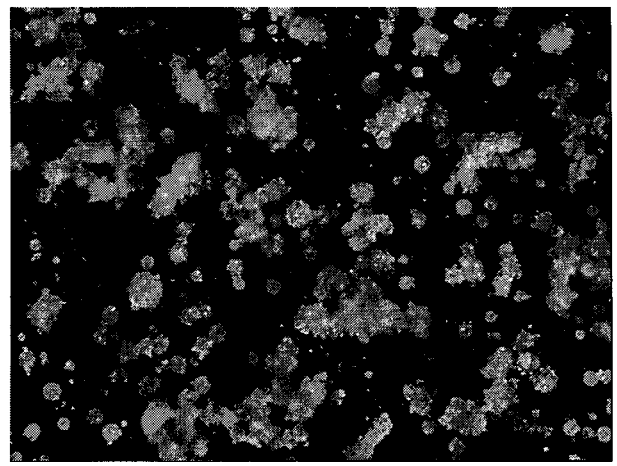
FIG. 7 shows an optical microscopic photograph of the olefin polymerization catalyst prepared in Comparative Example 3.

Using a Nikon Eclipse E200 type optical microscope-JVC color video camera, the magnesium chloride adducts and the catalyst components as prepared in Example 5 and Comparative Example 3 were observed. The optical microphotograph of the magnesium chloride adduct as prepared in Example 5 was shown in FIG. 4, and the optical microphotograph of the magnesium chloride adduct as prepared in Comparative Example 3 was shown in FIG. 5. The optical microphotograph of the catalyst component as prepared in Example 5 was shown in FIG. 6, and the optical microphotograph of the catalyst component as prepared in Comparative Example 3 was shown in FIG. 7.

Figure 4:
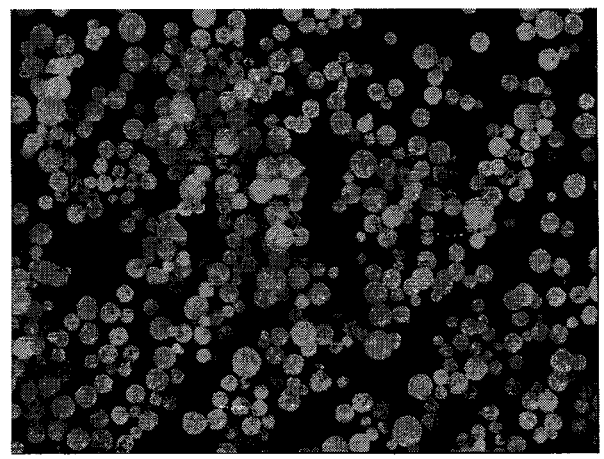
FIG. 4 shows an optical microscopic photograph of the spherical magnesium halide adduct prepared in Example 5.
Figure 5:
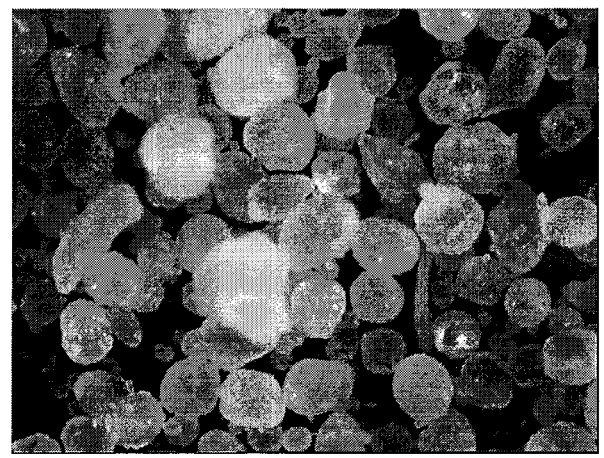
FIG. 5 shows an optical microscopic photograph of the magnesium halide adduct prepared in Comparative Example 3.

As can be seen from FIG. 4 and FIG. 5, the particles of the magnesium chloride adduct as prepared in Example 5 were featured with a relatively regular morphology, an essentially spherical shape, a relatively narrow particle size distribution, and a smooth particle surface, and were essentially free of non-spherical particles, whereas the particles of the magnesium chloride adduct as prepared in Comparative Example 3 had a large quantity of non-spherical particles. As can be seen from FIG. 6 and FIG. 7, the particles of the catalyst component as prepared in Example 5 were featured with a uniform particle size distribution and a regular morphology, whereas the particles of the catalyst component as prepared in Comparative Example 3 included a relatively high amount of broken particles.

Test Example 5

(1) Melt index of polymer was measured according to the method of ASTM D1238-99.

(2) Isotacticity of polymer was measured by a heptane extraction method carried out as follows: 2 g of dry polymer sample was extracted with boiling heptane in an extractor for 6 h, then the residual substance was dried to a constant weight, and the ratio of the weight of the residual polymer (g) to 2 g of the dry polymer sample was regarded as isotacticity.

The results as obtained according to the above method were shown in the below Table 3.

TABLE 3

| | Catalyst | Amount of $H_2$ (L) | Activity (kgPP/ gcat) | Isotacticity of polymer (%) | MI of polymer (g/10 min) |
|---|---|---|---|---|---|
| Example 5 | Catalyst component C3 | 1.5 | 39.3 | 98.3 | 8 |
| Example 6 | | 5.0 | 42.2 | 97.4 | 28 |
| Comparative Example 3 | Catalyst component DC2 | 1.5 | 47.0 | 98.3 | 4 |
| Comparative Example 4 | | 5.0 | 54.2 | 97.1 | 26 |
| Comparative Example 5 | Catalyst component DC3 | 1.5 | 48.2 | 98.2 | 3 |
| Comparative Example 6 | | 5.0 | 51.3 | 97.1 | 20 |

As can be seen from the data in Table 3, the catalyst, as prepared by using the magnesium chloride adduct according to the present invention as a catalyst support, had a relatively good hydrogen sensitivity in polymerization of propylene. Specifically, by comparing the melting index of the polymer as prepared from the polymerization of propylene using the catalyst component C3 with the melting indexes of the polymers as prepared from the polymerization of propylene using the catalyst components DC2 and DC3, it could be seen that the polymer prepared using the catalyst component C3 had a better hydrogen sensitivity.

The above concrete embodiments are only used for describing the embodiments of the present invention. However, the present invention is not limited to the concrete details in the above embodiments. Within the scope of the technical concept of the present invention, various simple modifications may be made to the technical solution of the present invention, and all of these simple modifications belong to the protection scope of the present invention.

In addition, it should be indicated that the various concrete technical features as described in the above concrete embodiments, in the case of not being contradictory, may be combined according to any suitable manner. In order to avoid unnecessary repetition, the various possible combination manners are not described herein.

Furthermore, the various different embodiments of the present invention may also be arbitrarily combined, and shall also be regarded as the contents disclosed in the present invention with a proviso that they do not go against the concept of the present invention.

What is claimed is:

1. A magnesium halide adduct, comprising at least one compound of formula MgXY, at least one compound of formula ROH, methanol, at least one modifying agent chosen from DOE and o-hydroxy benzoates, and optionally water, wherein in the formula MgXY, X is a halogen, and Y, being independent of X, is chosen from a halogen, $C_1$-$C_{14}$ alkyl, $C_1$-$C_{14}$ alkoxy, $C_6$-$C_{14}$ aryl, and $C_6$-$C_{14}$ aryloxy;

in the formula ROH, R is chosen from a $C_2$-$C_{12}$ alkyl, $C_3$-$C_{10}$ cycloalkyl, and $C_6$-$C_{10}$ aryl;

the DOE is chosen from polyol esters of formula (I)

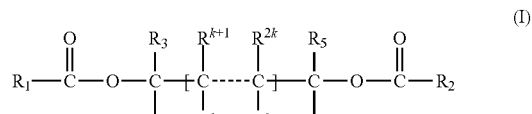

wherein, $R_1$ and $R_2$, which may be identical or different and are independent of each other, are chosen from a halogen, a substituted or unsubstituted linear or branched $C_1$-$C_{20}$ alkyl, $C_3$-$C_{20}$ cycloalkyl, $C_6$-$C_{20}$ aryl, $C_7$-$C_{20}$ aralkyl, and $C_2$-$C_{20}$ alkenyl;

$R_3$-$R_6$ and $R^1$-$R^{2k}$, which may be identical or different and are independent of each other, are chosen from hydrogen, a halogen, a substituted or unsubstituted linear or branched $C_1$-$C_{20}$ alkyl, $C_3$-$C_{20}$ cycloalkyl, $C_6$-$C_{20}$ aryl, $C_7$-$C_{20}$ aralkyl, $C_2$-$C_{20}$ alkenyl, $C_2$-$C_{20}$ ester groups, heteroatom-containing $C_1$-$C_{20}$ alkyl, heteroatom-containing $C_3$-$C_{20}$ cycloalkyl, heteroatom-containing $C_6$-$C_{20}$ aryl, heteroatom-containing $C_7$-$C_{20}$ aralkyl, heteroatom-containing $C_2$-$C_{20}$ alkenyl, wherein the heteroatom, is one or more chosen a halogen, nitrogen, oxygen, sulfur, silicon and phosphorus;

alternatively, two or more of $R_3$-$R_6$ and $R^1$-$R^{2k}$ are linked to form at least one ring structure chosen from saturated or unsaturated ring structures;

the moiety in the parentheses "[ ]" represents k carbon atoms linked in sequence, and each of the carbon atoms is further linked to two substituents, so that there are k carbon atoms and 2k substituents $R^1$, $R^2$, $R^3$ ... $R^{2k}$ in the parentheses; and k is an integer ranging from 0 to 10, wherein when k=0, in the polyol ester of formula (I), the carbon atom substituted with $R_3$ and $R_4$ is directly linked to the carbon atom substituted with $R_5$ and $R_6$; and the o-hydroxy benzoate is of formula (II):

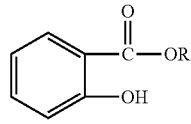

(II)

wherein, R is chosen from a linear or branched $C_1$-$C_{12}$ alkyl, $C_3$-$C_{10}$ cycloalkyl, $C_6$-$C_{10}$ aryl, and $C_7$-$C_{10}$ aralkyl.

2. The magnesium halide adduct according to claim 1, wherein the magnesium halide adduct is of formula MgXY-mROH-nCH$_3$OH-tM-qH$_2$O, wherein
M represents the at least one modifying agent; m ranges from 1-2.4; n ranges from 0.1-1.0; t ranges from 0.0001-0.1; and q ranges from 0-0.8.

3. The magnesium halide adduct according to claim 2, wherein m is 1.5-2.2, n is 0.3-0.8, t is 0.002-0.01, and q is 0-0.5.

4. The magnesium halide adduct according to claim 2, wherein the at least one modifying agent M is chosen from the o-hydroxy benzoates, and t ranges from 0.001-0.05.

5. The magnesium halide adduct according to claim 4, wherein t ranges from 0.002-0.04.

6. The magnesium halide adduct according to claim 1, wherein the at least one compound of the formula MgXY is chosen from magnesium dichloride, magnesium dibromide, phenoxy magnesium chloride, isopropoxy magnesium chloride and butoxy magnesium chloride.

7. The magnesium halide adduct according to claim 1, wherein the at least one compound of the formula ROH is chosen from ethanol, propanol, isopropanol, n-butanol, isobutanol, pentanol, isopentanol, n-hexanol, n-octanol and 2-ethylhexanol.

8. The magnesium halide adduct according to claim 1, wherein the o-hydroxy benzoate is one or more chosen from methyl o-hydroxy benzoate, ethyl o-hydroxy benzoate, n-propyl o-hydroxy benzoate, isopropyl o-hydroxy benzoate, n-butyl o-hydroxy benzoate and isobutyl o-hydroxy benzoate.

9. The magnesium halide adduct according to claim 1, wherein, in the DOE of formula (I),
$R_1$ and $R_2$, which may be identical or different and are independent of each other, are chosen from a halogen, $C_1$-$C_{12}$ alkyl, $C_3$-$C_{12}$ cycloalkyl, $C_6$-$C_{12}$ aryl, $C_7$-$C_{12}$ aralkyl, and $C_2$-$C_{12}$ alkenyl; and
$R_3$-$R_6$ and $R^1$-$R^{2k}$, which may be identical or different and are independent of each other, are chosen from hydrogen, a halogen, $C_1$-$C_{12}$ alkyl, $C_3$-$C_{12}$ cycloalkyl, $C_6$-$C_{12}$ aryl, $C_7$-$C_{12}$ aralkyl, $C_2$-$C_{12}$ alkenyl, and $C_2$-$C_{12}$ ester groups.

10. The magnesium halide adduct according to claim 9, wherein $R_1$ and $R_2$ are independent of each other and are chosen from a $C_1$-$C_6$ alkyl, $C_3$-$C_6$ cycloalkyl, $C_6$-$C_8$ aryl, and $C_7$-$C_8$ aralkyl;
$R_3$-$R_6$ are independent of each other and are chosen from hydrogen, $C_1$-$C_6$ alkyl, and $C_3$-$C_6$ cycloalkyl; and
$R^1$-$R^{2k}$ are independent of each other and are chosen from hydrogen and a $C_1$-$C_4$ alkyl.

11. The magnesium halide adduct according to claim 1, wherein the DOE is chosen from diol esters of formula (Ia):

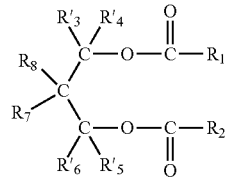

(Ia)

wherein, $R_1$ and $R_2$, which may be identical or different and are independent of each other, are chosen from a halogen, a substituted or unsubstituted linear or branched $C_1$-$C_{20}$ alkyl, $C_3$-$C_{20}$ cycloalkyl, $C_6$-$C_{20}$ aryl, $C_7$-$C_{20}$ aralkyl, and $C_2$-$C_{20}$ alkenyl;
$R_3'$-$R_6'$, $R_7$ and $R_8$, which may be identical or different and are independent of each other, are chosen from hydrogen, a halogen, a linear or branched $C_1$-$C_{20}$ alkyl, $C_3$-$C_{20}$ cycloalkyl, $C_6$-$C_{20}$ aryl, $C_7$-$C_{20}$ aralkyl, $C_2$-$C_{20}$ alkenyl, heteroatom-containing $C_1$-$C_{20}$ alkyl, heteroatom-containing $C_3$-$C_{20}$ cycloalkyl, heteroatom-containing $C_6$-$C_{20}$ aryl, heteroatom-containing $C_7$-$C_{20}$ aralkyl, and heteroatom-containing $C_2$-$C_{20}$ alkenyl, wherein the heteroatom is one or more chosen from a halogen, nitrogen, oxygen, sulfur, silicon, and phosphorus;
alternatively, two or more of $R_3'$-$R_6'$ and $R_7$-$R_8$ are linked to form at least one ring structure chosen from saturated or unsaturated ring structures.

12. The magnesium halide adduct according to claim 11, wherein $R_1$ and $R_2$ are independent of each other and are chosen from a halogen, a $C_1$-$C_{12}$ alkyl, $C_3$-$C_{12}$ cycloalkyl, $C_6$-$C_{12}$ aryl, $C_7$-$C_{12}$ aralkyl, and $C_2$-$C_{12}$ alkenyl; and
$R_3'$-$R_6'$ and $R_7$-$R_8$ are independent of each other and are chosen from hydrogen, a halogen, a $C_1$-$C_{12}$ alkyl, $C_3$-$C_{12}$ cycloalkyl, $C_6$-$C_{12}$ aryl, $C_7$-$C_{12}$ aralkyl, and $C_2$-$C_{12}$ alkenyl.

13. The magnesium halide adduct according to claim 12, wherein $R_1$ and $R_2$ are independent of each other and are chosen from a $C_1$-$C_6$ alkyl, $C_3$-$C_6$ cycloalkyl, $C_6$-$C_8$ aryl, and $C_7$-$C_8$ aralkyl;
$R_3'$-$R_6'$ are independent of each other and are chosen from hydrogen, $C_1$-$C_6$ alkyl, and $C_3$-$C_6$ cycloalkyl; and
$R_7$-$R_8$ are independent of each other and are chosen from hydrogen and a $C_1$-$C_4$ alkyl.

14. The magnesium halide adduct according to claim 13, wherein the diol ester of formula (Ia) is one or more chosen from 1,3-propanediol dibenzoate, 2-methyl-1,3-propanediol dibenzoate, 2-ethyl-1,3-propanediol dibenzoate, 2,2-dimethyl-1,3-propanediol dibenzoate, (R)-1-phenyl-1,3-propanediol dibenzoate, 1,3-diphenyl-1,3-propanediol dibenzoate, 1,3-diphenyl-1,3-propanediol di-n-propionate, 1,3-diphenyl-2-methyl-1,3-propanediol dipropionate, 1,3-diphenyl-2-methyl-1,3-propanediol diacetate, 1,3-diphenyl-2,2-dimethyl-1,3-propanediol dibenzoate, 1,3-diphenyl-2,2-dimethyl-1,3-propanediol dipropionate, 1,3-di-t-butyl-2-ethyl-1,3-propanediol dibenzoate, 1,3-diphenyl-1,3-propanediol diacetate, 1,3-diisopropyl-1,3-propanediol di(4-butylbenzoate), 1-phenyl-2-amino-1,3-propanediol dibenzoate, 1-phenyl-2-methyl-1,3-butanediol dibenzoate, 1-phenyl-2-methyl-1,3-butanediol neopentanoate, 3-butyl-2,4-pentanediol dibenzoate, 3,3-dimethyl-2,4-pentanediol dibenzoate, 2,4-pentanediol dibenzoate, 2,4-pentanediol di(p-chlorobenzoate), 2,4-pentanediol di(m-chloro benzoate), 2,4-pentanediol di(p-bromobenzoate), 2,4-pentanediol di(o-bromobenzoate), 2,4-pentanediol di(p-methylbenzoate), 2,4-pentanediol di(p-t-butylbenzoate), 2,4- pentanediol di(p-butylbenzoate), 2-methyl-1,3-pentanediol di(p-chlorobenzoate), 2-methyl-1,3-pentanediol di(p-methylbenzoate), 2-butyl-1,3-pentanediol di(p-methylbenzoate), 2-methyl-1,3-pentanediol di(p-t-butylbenzoate), 2-methyl-1,3-pentanediol neopentanoate, 2-methyl-1,3-pentanediol benzoate cinnamate, 2,2-dimethyl-1,3-pentanediol dibenzoate, 2,2-dimethyl-1,3-pentanediol benzoate cinnamate, 2-ethyl-1,3-pentanediol dibenzoate, 2-butyl-1,3-pentanediol dibenzoate, 2-allyl-1,3-pentanediol dibenzoate, 2-methyl-1,3-pentanediol dibenzoate, 2-ethyl-1,3-pentanediol dibenzoate, 2-propyl-1,3-pentanediol dibenzoate, 2-butyl-1,3-pentanediol dibenzoate, 2,2-dimethyl-1,3-pentanediol dibenzoate, 1,3-pentanediol di(p-chlorobenzoate), 1,3-pentanediol di(m-chloro benzoate), 1,3-pentanediol di(p-bromobenzoate), 1,3-pentanediol di(o-bromobenzoate), 1,3-pentanediol di(p-methylbenzoate), 1,3-pentanediol di(p-t-butylbenzoate), 1,3-pentanediol di(p-butylbenzoate), 1,3-pentanediol benzoate cinnamate, 1,3-pentanediol dicinnamate, 1,3-pentanediol dipropionate, 2-methyl-1,3-pentanediol benzoate cinnamate, 2,2-dimethyl-1,3-pentanediol dibenzoate, 2,2-dimethyl-1,3-pentanediol benzoate cinnamate, 2-ethyl-1,3-pentanediol dibenzoate, 2-butyl-1,3-pentanediol dibenzoate, 2-allyl-1,3-pentanediol dibenzoate, 2-methyl-1,3-pentanediol benzoate cinnamate, 2,2,4-trimethyl-1,3-pentanediol diisopropylformate, 1-trifluoromethyl-3-methyl-2,4-pentanediol dibenzoate, 2,4-pentanediol di-p-fluoromethyl benzoate, 2,4-pentanediol di(2-furanformate), 2-methyl-6-heptene-2,4-heptanediol dibenzoate, 3-methyl-6-heptene-2,4-heptanediol dibenzoate, 4-methyl-6-heptene-2,4-heptanediol dibenzoate, 5-methyl-6-heptene-2,4-heptanediol dibenzoate, 6-methyl-6-heptene-2,4-heptanediol dibenzoate, 3-ethyl-6-heptene-2,4-heptanediol dibenzoate, 4-ethyl-6-heptene-2,4-heptanediol dibenzoate, 5-ethyl-6-heptene-2,4-heptanediol dibenzoate, 6-ethyl-6-heptene-2,4-heptanediol dibenzoate, 3-propyl-6-heptene-2,4-heptanediol dibenzoate, 4-propyl-6-heptene-2,4-heptanediol dibenzoate, 5-propyl-6-heptene-2,4-heptanediol dibenzoate, 6-propyl-6-heptene-2,4-heptanediol dibenzoate, 3-butyl-6-heptene-2,4-heptanediol dibenzoate, 4-butyl-6-heptene-2,4-heptanediol dibenzoate, 5-butyl-6-heptene-2,4-heptanediol dibenzoate, 6-butyl-6-heptene-2,4-heptanediol dibenzoate, 3,5-dimethyl-6-heptene-2,4-heptanediol dibenzoate, 3,5-diethyl-6-heptene-2,4-heptanediol dibenzoate, 3,5-dipropyl-6-heptene-2,4-heptanediol dibenzoate, 3,5-dibutyl-6-heptene-2,4-heptanediol dibenzoate, 3,3-dimethyl-6-heptene-2,4-heptanediol dibenzoate, 3,3-diethyl-6-heptene-2,4-heptanediol dibenzoate, 3,3-dipropyl-6-heptene-2,4-heptanediol dibenzoate, 3,3-dibutyl-6-heptene-2,4-heptanediol dibenzoate, 3-ethyl-3,5-heptanediol dibenzoate, 4-ethyl-3,5-heptanediol dibenzoate, 5-ethyl-3,5-heptanediol dibenzoate, 3-propyl-3,5-heptanediol dibenzoate, 4-propyl-3,5-heptanediol dibenzoate, 3-butyl-3,5-heptanediol dibenzoate, 2,3-dimethyl-3,5-heptanediol dibenzoate, 2,4-dimethyl-3,5-heptanediol dibenzoate, 2,5-dimethyl-3,5-heptanediol dibenzoate, 2,6-dimethyl-3,5-heptanediol dibenzoate, 3,3-dimethyl-3,5-heptanediol dibenzoate, 4,4-dimethyl-3,5-heptanediol dibenzoate, 4,5-dimethyl-3,5-heptanediol dibenzoate, 4,6-dimethyl-3,5-heptanediol dibenzoate, 4,4-dimethyl-3,5-heptanediol dibenzoate, 6,6-dimethyl-3,5-heptanediol dibenzoate, 2-methyl-3-ethyl-3,5-heptanediol dibenzoate, 2-methyl-4-ethyl-3,5-heptanediol dibenzoate, 2-methyl-5-ethyl-3,5-heptanediol dibenzoate, 3-methyl-3-ethyl-3,5-heptanediol dibenzoate, 3-methyl-4-ethyl-3,5-heptanediol dibenzoate, 3-methyl-5-ethyl-3,5-heptanediol dibenzoate, 4-methyl-3-ethyl-3,5-heptanediol dibenzoate, 4-methyl-4-ethyl-3,5-heptanediol dibenzoate, 9,9-bis(benzoyloxymethyl)fluorene, 9,9-bis((m-methoxybenzoyloxy)methyl)fluorene, 9,9-bis((m-chlorobenzoyloxy)methyl)fluorene, 9,9-bis((p-chlorobenzoyloxy)methyl)fluorene, 9,9-bis(cinnamoyloxymethyl)fluorene, 9-(benzoyloxymethyl)-9-(propylcarboxylmethyl)fluorene, 9,9-bis(propylcarboxylmethyl)fluorene, 9,9-bis(acryloxymethyl)fluorene, and 9,9-bis(neopentylcarboxylmethyl)fluorene.

15. The magnesium halide adduct according to claim 1, wherein the magnesium halide adduct is in the form of spherical particles, and said spherical particles have an average particle diameter ranging from 10 μm to 100 μm.

16. A catalyst component for olefin polymerization, comprising a product obtained from a reaction of at least one magnesium halide adduct according to claim 1, at least one titanium compound and at least one internal electron donor compound.

17. The catalyst component according to claim 16, wherein the at least one titanium compound is chosen from compounds of formulae $Ti(OR')_{3-a}Z_a$ and $Ti(OR')_{4-b}Z_b$, wherein R' is chosen from $C_1$-$C_{20}$ alkyl, Z is halogen, a is an integer ranging from 1-3, and b is an integer ranging from 1-4.

18. The catalyst component according to claim 17, wherein the at least one titanium compound is chosen from titanium trichloride, titanium tetrafluoride, titanium tetrachloride, titanium tetrabromide, titanium tetraiodide, tributoxy titanium chloride, dibutyoxy titanium dichloride, butyoxy titanium trichloride, triethoxy titanium chloride, diethoxy titanium dichloride, ethoxy titanium trichloride and titanium trichloride.

19. The catalyst component according to claim 18, wherein the at least one titanium compound is chosen from titanium tetrachloride and titanium tetrabromide.

20. The catalyst component according to claim 16, wherein the at least one internal electron donor compound is chosen from carboxylates, alcohol esters, ethers, ketones, amines and silanes.

21. The catalyst component according to claim 20, wherein the at least one internal electron donor compound is chosen from monohydric and polyhydric aliphatic carboxylates, monhydric and polyhydric aromatic carboxylates, dihydric alcohol esters and diethers.

22. The catalyst component according to claim 16, wherein the weight ratio of the titanium element in the titanium compound, the magnesium element in the magnesium halide adduct and the at least one internal electron donor compound is 1:(5-15):(2-15).

23. The catalyst component according to claim 22, wherein the weight ratio of the titanium element in the titanium compound, the magnesium element in the magnesium halide adduct and the at least one internal electron donor compound is 1:(6-13):(3-12).

24. A process for preparing a catalyst component for olefin polymerization, comprising adding contacting the magnesium halide adduct according to claim 1 with at least one titanium compound and at least one internal electron donor compound to form a catalyst component.

25. A process for preparing a catalyst for olefin polymerization, comprising contacting together: (1) a catalyst component comprising the magnesium halide adduct according to claim 1 as a catalyst support, (2) at least one alkyl aluminum compound, and (3) optionally at least one external electron donor compound.

26. A catalyst for olefin polymerization, which comprises:
(1) the catalyst component for olefin polymerization according to claim 16;
(2) at least one alkyl aluminum compound; and (3) optionally at least one external electron donor compound.

27. A process for olefin polymerization, comprising: contacting the catalyst for olefin polymerization according to claim 26 with at least one olefin.

* * * * *